(12) United States Patent
Tachibana et al.

(10) Patent No.: US 7,688,699 B2
(45) Date of Patent: Mar. 30, 2010

(54) HOLOGRAPHIC RECORDING/REPRODUCING APPARATUS HAVING RELATIVE SPEED CONTROLLER AND METHOD

(75) Inventors: Akihiro Tachibana, Tsurugashima (JP); Satoru Tanaka, Tsurugashima (JP); Yoshihisa Itoh, Tsurugashima (JP); Yoshihisa Kubota, Tsurugashima (JP); Kazuo Kuroda, Tsurugashima (JP); Satoshi Sugiura, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 86 days.

(21) Appl. No.: 11/896,402

(22) Filed: Aug. 31, 2007

(65) Prior Publication Data
US 2008/0002553 A1 Jan. 3, 2008

Related U.S. Application Data

(62) Division of application No. 10/522,342, filed on Jan. 25, 2005, now abandoned.

(51) Int. Cl.
G11B 7/00 (2006.01)
(52) U.S. Cl. ...................................... 369/103
(58) Field of Classification Search ............ None
See application file for complete search history.

(56) References Cited

U.S. PATENT DOCUMENTS

| | | | |
|---|---|---|---|
| 3,964,032 A | 6/1976 | Bardos | |
| 4,104,489 A | 8/1978 | Satoh et al. | |
| 4,224,480 A | 9/1980 | Satoh et al. | |
| 5,028,102 A | 7/1991 | Ogura et al. | |
| 5,465,248 A | 11/1995 | Fuji | |
| 2004/0062178 A1 | 4/2004 | Horimai | |

FOREIGN PATENT DOCUMENTS

| CN | 1299507 A | 6/2001 |
|---|---|---|
| EP | 1065658 A1 | 1/2001 |
| JP | 11-311936 | 11/1999 |
| WO | WO99/44195 | 9/1999 |
| WO | WO 2002/049018 | * 6/2002 |

OTHER PUBLICATIONS

Chinese Search Report dated Mar. 10, 2006, with partial English translation.

* cited by examiner

*Primary Examiner*—Joseph H Feild
*Assistant Examiner*—Christopher R Lamb
(74) *Attorney, Agent, or Firm*—McGinn IP Law Group, PLLC

(57) ABSTRACT

A holographic recording and reproducing apparatus comprises: a pickup for moving an objective lens that focuses a coherent light beam along a recording track on a holographic recording medium and for detecting reflected light from the recording track to perform focus- and tracking-servo control; a relative velocity determination unit for determining a relative velocity of a converging position of the objective lens with respect to the holographic recording medium; a driving unit for changing a relative position of the objective lens with respect to an optical path of the coherent light beam so as to make the relative velocity fall within a predetermined range at least during a predetermined period; and a control unit for performing recording or reproduction for a recording layer during the predetermined period. The holographic recording medium includes a plurality of markers used for positioning an optical interference pattern of the coherent light beam.

12 Claims, 28 Drawing Sheets

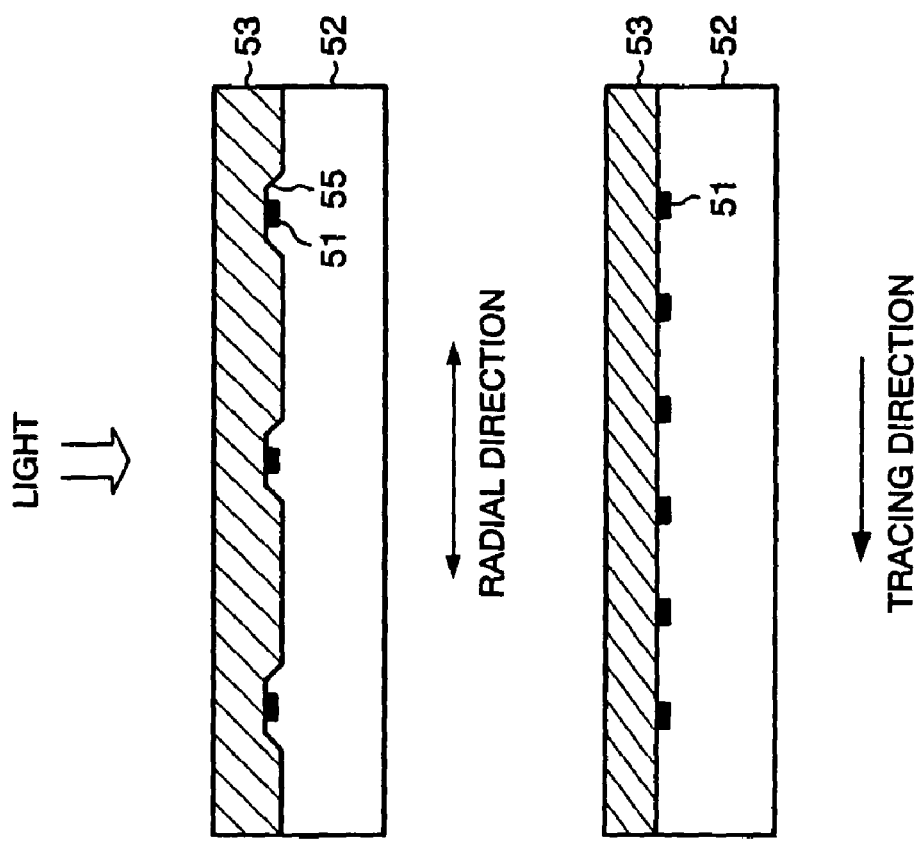

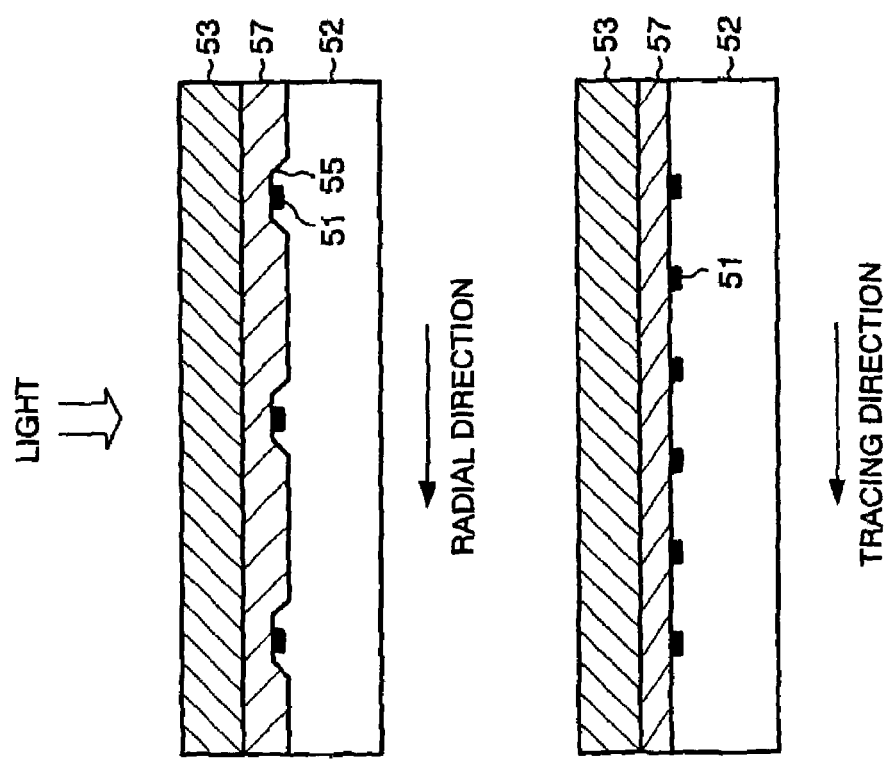

HOLOGRAPHIC RECORDING/REPRODUCING APPARATUS HAVING RELATIVE SPEED CONTROLLER AND METHOD

The present Application is a Divisional Application of U.S. patent application Ser. No. 10/522,342, filed Jan. 25, 2005 now abandoned

TECHNICAL FIELD

The present invention relates to a recording medium formed of a photosensitive material, i.e., a holographic recording medium, and also relates to a holographic recording and reproducing method and an optical information recording and reproducing apparatus and the like, which use the holographic recording medium.

BACKGROUND ART

A volume holographic recording system is known as a digital information recording system employing the principle of hologram. The feature of the system is that an information signal is recorded in a recording medium as a change of a refractive index. The recording medium is made from a photo-refractive material such as single-crystal lithium niobate.

As one of the conventional holographic recording and reproducing methods, a method is known which performs recording and reproduction by using Fourier transform.

As shown in FIG. 1, in a conventional 4f-system holographic recording and reproducing apparatus, laser light 12 emitted from a laser light source 11 is split into a signal light 12A and a recording reference light 12B by a beam splitter 13. The signal light 12A passes through a beam expander 14 where the beam diameter thereof is expanded, and is then incident as collimated light on a spatial light modulator (SLM) 15 such as a transmission-type TFT liquid crystal device (LCD) panel. The spatial light modulator (SLM) 15 receives recording data that has been converted into an electric signal by an encoder 25, and forms a dot pattern of bright and dark dots on a plane. When being transmitted through the spatial light modulator (SLM) 15, the signal light 12A is optically modulated so as to include a data signal component. The signal light 12A including the dot pattern signal component passes through a Fourier transform lens 16 arranged away from the spatial light modulator (SLM) 15 by a focal distance f of the lens 16, thereby the dot pattern signal component is transformed by Fourier transform. Thus, the signal light 12A is converged on a position in a recording medium 5. On the other hand, the recording reference light 12B obtained by splitting by the beam splitter 13 is directed to the inside of the recording medium 5 by a mirror 18 and a rotatable mirror 19, and intersects with the optical path of the signal light 12A in the recording medium 5 so as to form an optical interference pattern. The entire optical interference pattern is recorded in the recording medium 5 as a change of a refractive index.

In the above-mentioned manner, diffracted light from image data that has been illuminated with coherent collimated light is converged by the Fourier transform lens, thereby the image data is transformed into a distribution on a focal plane of the Fourier transform lens, i.e., a Fourier plane. The distribution obtained as a result of Fourier transform is made to interfere with a coherent reference light, so that interference fringes thus generated are recorded in the recording medium placed in the vicinity of the focal point of the Fourier transform lens. When recording of data of one page (hereinafter, simply referred to as a "page") is finished, the rotatable mirror 19 is rotated by a predetermined amount and is translated by a predetermined distance, thereby changing an angle of incidence of the recording reference light 12B with respect to the recording medium 5. Then, data of the next page is recorded in a similar manner. By performing sequential recording in the above-described manner, angular multiplex recording is performed.

In reproduction, on the other hand, a dot pattern image is reproduced by performing inverse Fourier transform. In data reproduction, as shown in FIG. 1, the optical path of the signal light 12A is blocked by the spatial light modulator (SLM) 15, for example, thereby allowing only the reference light 12B to be incident on the recording medium 5. In reproduction, the position and angle of the rotatable mirror 19 are changed and controlled by a combination of rotation and translation of the rotatable mirror 19 so as to make the angle of incidence of the reference light the same as that of the recording reference light when a page to be reproduced was recorded. On the opposite side of the recording medium 5 on which the reference light 12B is incident, reproduction light that reproduces the optical interference pattern that has been recorded. The reproduction light is directed to an inverse Fourier transform lens 16A arranged away from the recording medium 5 by a focal distance f of the lens 16A, where the reproduction light is subjected to inverse Fourier transform. Thus, a dot pattern signal can be reconstructed. Moreover, the dot pattern signal is received by a photodetector 20 such as a charge-coupled device CCD, arranged at a position away from the lens 16A by the focal distance of the lens 16A, and is then converted into an electric digital data signal again. Then, the electric digital data signal is sent to a decoder 26, thereby original data is reproduced.

As described above, in order to record information in a certain volume in a recording medium with high density, the recording was conventionally performed for that volume of several cubic millimeters in a multiplexing manner using angular multiplexing or wavelength multiplexing. In such a recording or reproducing operation, signal light and/or reference light had to be fixed at a predetermined recording or reproducing position in the recording medium for a predetermined time period in accordance with the sensitivity of the recording medium and the photodetector. Thus, in recording of data, a position of interference between the signal light and the reference light was adjusted to the predetermined recording position in the recording medium and the recording of the data was then performed, while the recording medium was fixed. Subsequently, the position of the interference was moved and then next data was recorded. In reproduction, a position illuminated with the reference light was adjusted to the recording position at which the data was recorded and reproduction was then performed, while the recording medium was fixed. After the reproduction from that recording position was finished, the illuminated position was moved and then next data was reproduced.

Thus, the conventional technique had a problem that it was difficult to perform high-density recording and reproduction at a high speed. Moreover, there was another problem that in order to control a light beam in recording and reproduction, a high-precision paging control mechanism was required. This was disadvantageous to the size reduction of the system.

The present invention was made in view of the above, and the problems mentioned above are exemplary problems to be solved by the present invention. In other words, it is an object of the present invention to provide a recording and/or reproducing apparatus and a recording and/or reproducing method that can avoid a limitation on a recording or reproducing speed so as to enable high-speed and high-density recording and reproduction.

It is another object of the present invention to provide a recording medium that can avoid the aforementioned limitation on the recording or reproducing speed so as to enable high-speed and high-density holographic recording and reproduction.

DISCLOSURE OF THE INVENTION

A holographic recording apparatus of the present invention records data on a holographic recording medium in the form of a flat plate which includes a recording layer comprising a photosensitive material and for which recording is achieved by an interference pattern of a coherent light beam. The holographic recording apparatus comprises: a pickup including an objective lens which focuses the coherent light beam, for moving the objective lens along a recording track of the holographic recording medium and detecting reflected light from the recording track to perform focus- and tracking-servo control; a relative velocity determination unit for determining a relative velocity of a converging position of the objective lens with respect to the holographic recording medium; a driving unit for changing a relative position of the objective lens with respect to an optical path of the coherent light beam in such a manner that the relative velocity falls within a predetermined range at least during a predetermined period; and a control unit for performing recording for the recording layer during the predetermined period.

A holographic reproducing apparatus of the present invention reproduces data recorded on a holographic recording medium in the form of a flat plate which includes a recording layer comprising a photosensitive material and for which recording is achieved by an interference pattern of a coherent light pattern. The holographic reproducing apparatus comprises: a pickup having an objective lens which focuses the coherent light beam, for moving the objective lens along a recording track of the holographic recording medium and detecting reflected light from the recording track so as to perform focus- and tracking-servo control; a relative velocity determination unit for determining a relative velocity of a converging position of the objective lens with respect to the holographic recording medium; a driving unit for relatively moving a position of the objective lens with respect to an optical path of the coherent light beam in such a manner that the relative velocity falls within a predetermined range at least during a predetermined period; and a control unit for performing reproduction from the recording layer during the predetermined period.

A holographic recording method of the present invention is a method for recording data on a holographic recording medium in the form of a flat plate which includes a recording layer comprising a photosensitive material and for which recording is achieved by an interference pattern of a coherent light beam. The holographic recording method comprises: a step of focusing the coherent light beam by an objective lens; a step of moving the objective lens along a recording track of the holographic recording medium and detecting reflected light from the recording track to perform focus- and tracking-servo control; a relative velocity determination step of determining a relative velocity of a converging position of the objective lens with respect to the holographic recording medium; a driving step of relatively moving a position of the objective lens with respect to an optical path of the coherent light beam in such a manner that the relative velocity falls within a predetermined range at least during a predetermined period; and a step of performing recording for the recording layer during the predetermined period.

A holographic reproducing method of the present invention is a method for reproducing data recorded on a holographic recording medium in the form of a flat plate which includes a recording layer comprising a photosensitive material and for which recording is achieved by an interference pattern of a coherent light pattern. The holographic reproducing method comprises: a step of focusing the coherent light beam by an objective lens; a step of moving the objective lens along a recording track of the holographic recording medium and detecting reflected light from the recording track so as to perform focus- and tracking-servo control; a relative velocity determination step of determining a relative velocity of a converging position of the objective lens with respect to the holographic recording medium; a driving step of relatively moving a position of the objective lens with respect to an optical path of the coherent light beam in such a manner that the relative velocity falls within a predetermined range at least during a predetermined period; and a step of performing reproduction from the recording layer during the predetermined period.

A holographic recording medium of the present invention is a holographic recording medium on which an optical interference pattern of a coherent light beam is recorded as a spatial change of a refractive index. The holographic recording medium comprises a plurality of markers for positioning the optical interference pattern.

BRIEF DESCRIPTION OF THE DRAWINGS

FIG. 27 shows cross-sectional views of a portion of a recording medium in a radial direction and a tracing direction, according to another embodiment of the present invention.

FIG. 28 shows cross-sectional views of a portion of a recording medium in a radial direction and a tracing direction, according to another embodiment of the present invention.

BEST MODE FOR CARRYING OUT THE INVENTION

Figure 1:
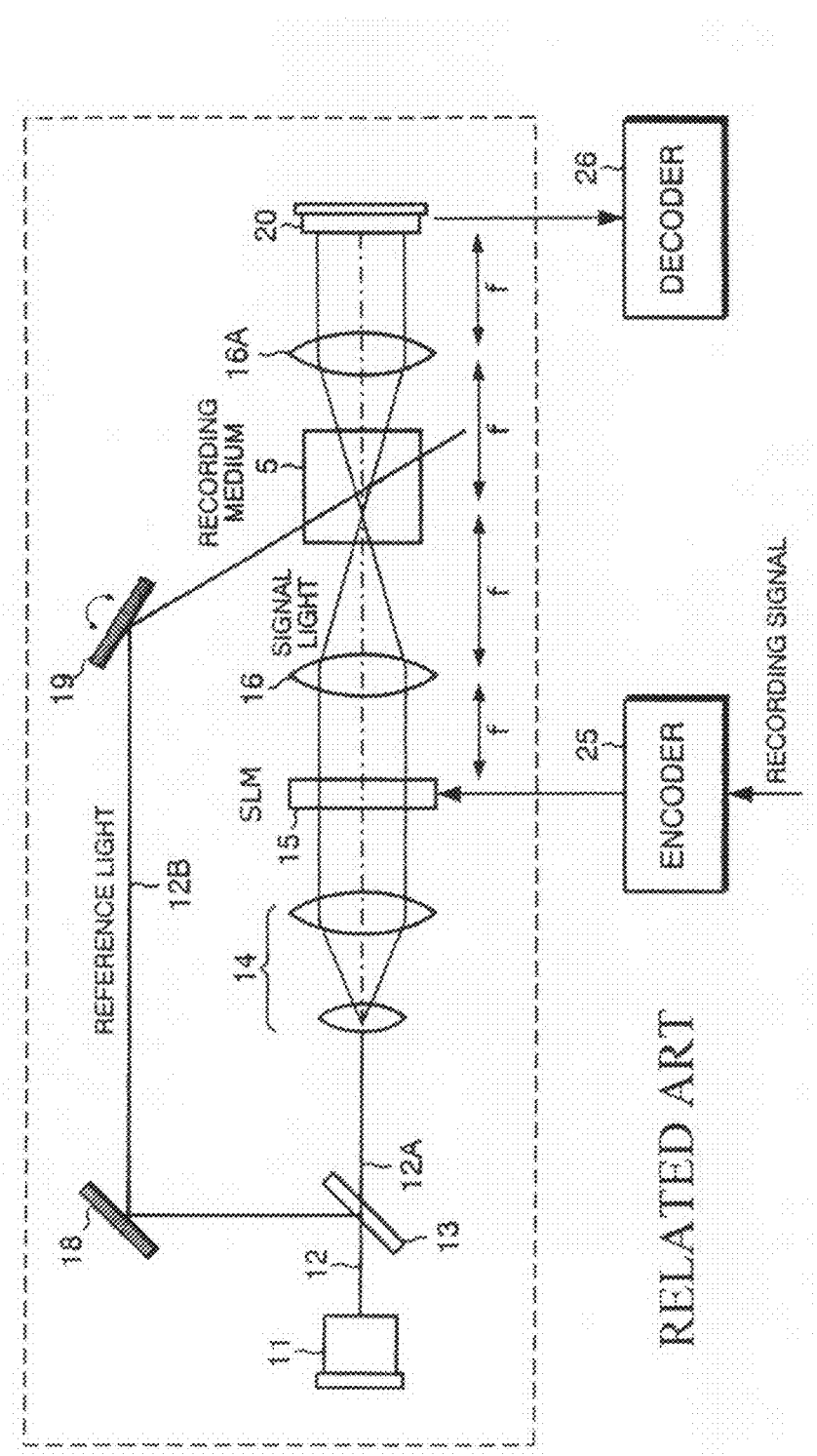
FIG. 1 shows a structure of a conventional 4f-system holographic recording and reproducing apparatus.

Embodiments of the present invention will be described in detail, with reference to the drawings. In the drawings described below, parts that are substantially the same are labeled with the same reference numerals.

First Embodiment

Figure 2:
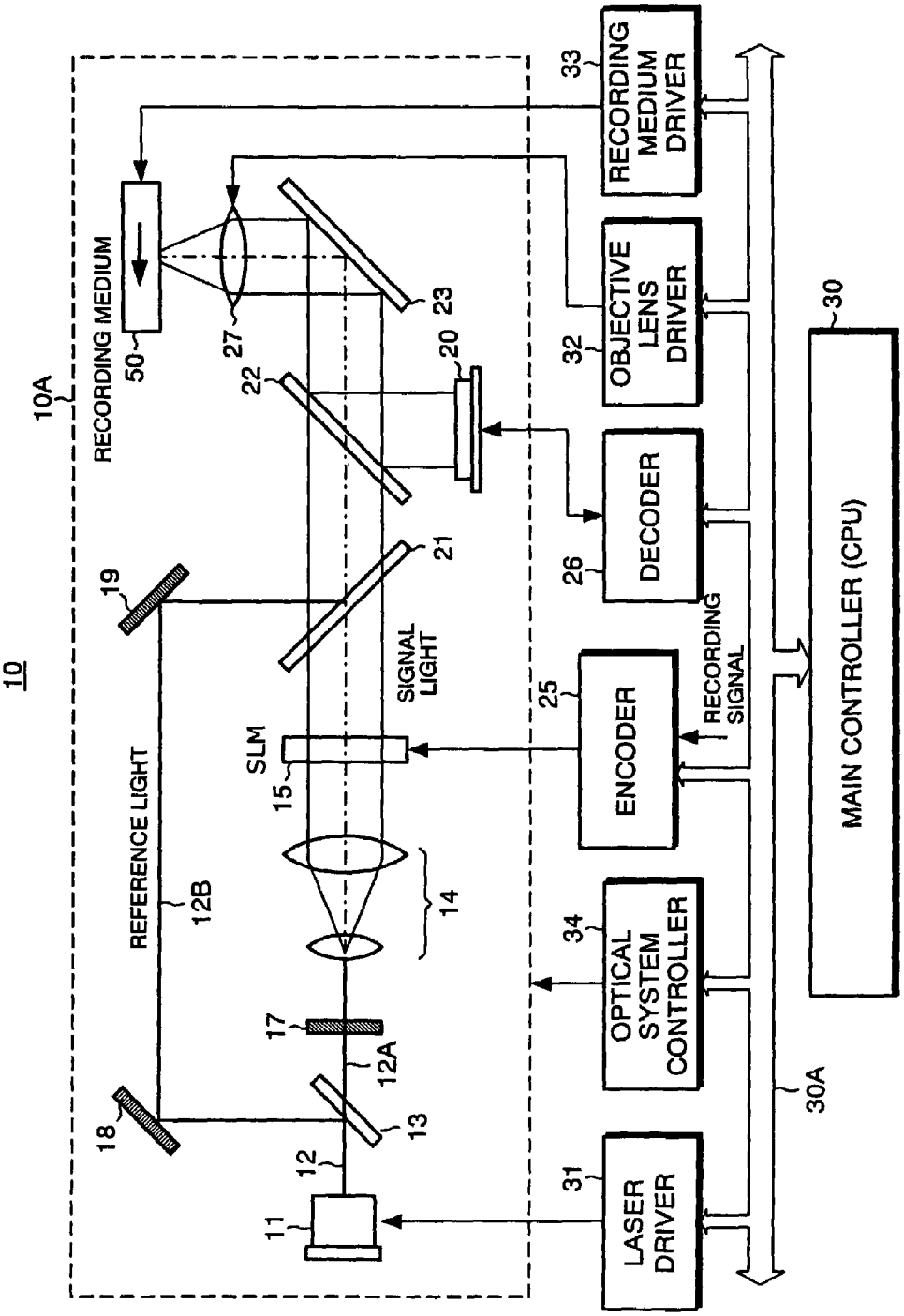
FIG. 2 is a block diagram of a structure of a holographic recording and/or reproducing apparatus according to a first embodiment of the present invention.

FIG. 2 is a block diagram of a structure of a holographic recording and/or reproducing apparatus 10 according to a first embodiment of the present invention.

In an optical system 10A of the holographic recording and reproducing apparatus 10, a DBR (Distributed Bragg Reflector) laser that emits near-infrared light having a wavelength of 850 nm is used as a source 11 of a signal light 12A and recording reference light 12B, for example. The laser light source 11 is driven by a laser driver 31. The laser driver 31 is controlled by a main controller (CPU) 30 that is connected to respective circuit blocks of the holographic recording and reproducing apparatus 10 and controls the entire apparatus. In other words, the main controller 30 supplies various control signals including a write timing signal to the laser driver 31 which in turn drives the laser light source 11 based on the control signals.

Laser light 12 emitted from the laser light source 11 is split by the beam splitter 13 into a signal light 12A and a recording reference light 12B. The signal light 12A passes through a beam expander 14 in which a beam diameter of the signal light 12A is enlarged, and is then incident as collimated light on a spatial light modulator (SLM) 15 such as a transmission-type TFT liquid crystal device (LCD) panel.

The spatial light modulator (SLM) 15 forms a dot pattern of bright and dark dots based on a data signal to be recorded. More specifically, an encoder 25 receives the recording data signal formed by a one-dimensional serial digital signal sequence and converts the received signal into two-dimensional data sequence. The encoder 25 further adds an error correcting code to the two-dimensional data sequence, thereby generating a two-dimensional data signal (unit page sequence data signal). Moreover, an SLM driver (not shown) is provided in the encoder 25, which generates a driving signal based on the two-dimensional data signal so as to drive the spatial light modulator (SLM) 15. In this manner, a two-dimensional pattern is formed on the spatial light modulator (SLM) 15.

When being transmitted through the spatial light modulator (SLM) 15, the signal light 12A is optically modulated by the above pattern. In other words, the spatial light modulator (SLM) 15 has modulation process elements that correspond to a unit page, and transmit or block a coherent signal beam having the wavelength of 850 nm that was incident thereon, on a pixel-by-pixel basis, in accordance with the unit page sequence data from the encoder 25, thereby generating a modulated signal light beam. More specifically, the spatial light modulator 15 allows the signal beam to pass therethrough in response to logical values "1" of the unit page sequence data that is an electric signal, and blocks the signal beam in response to logical values "0." In this manner, electrical-optical conversion is achieved in accordance with the contents of the respective bits in the unit page data, so that the modulated signal light beam (signal beam) as a signal light for the unit page sequence is generated.

The signal light 12A carrying that recording data signal passes through half mirrors 21 and 22 and is then reflected by a mirror 23. The signal light 12A reflected by the mirror 23 is converged by an objective lens 27 onto a recording position in a recording medium 50. That is, the dot pattern of the signal light 12A is transformed by Fourier transform, and is then converged to the position in the recording medium 50.

The objective lens 27 is driven by an objective lens driver 32 that is controlled by the main controller (CPU) 30. In other words, as described later in detail, a converging position of the objective lens 27 is controlled by the main controller 30.

On the other hand, the reference light 12B obtained by splitting by the beam splitter 13 is directed to a half mirror 21 by mirrors 18 and 19. The half mirror 21 reflects the reference light 12B to direct it into the recording medium 50 along the same optical path as the signal light 12A. Thus, the reference light 12B intersects with the signal light 12A inside the recording medium 50 so as to form an optical interference pattern that is recorded as a change of a refractive index.

On the other hand, in reproduction, inverse Fourier transform is performed so as to reproduce a dot pattern image. In data reproduction, as shown in FIG. 2, the optical path of the signal light 12A is blocked by a shutter 17 or the spatial light modulator (SLM) 15, for example, thereby illuminating the recording medium 50 with the reference light 12B only. Thus, reproduction light that reconstructs the recorded optical interference pattern appears. The reproduction light is directed to the objective lens 27. In reproduction, the objective lens 27 serves as an inverse Fourier transform lens. By performing inverse Fourier transform, a dot pattern signal can be reconstructed. Then, the dot pattern signal is received by a photodetector 20 such as a charge-coupled device (CCD) where the dot pattern signal is converted again into an electric digital data signal, and thereafter the converted signal is sent to a decoder 26. Thus, the recorded data is reproduced.

The recording medium 50 can be fixed to a driving mechanism such as a motor, an actuator or the like, and can be rotated or translated. Therefore, it is possible to perform holographic recording and reproduction while the recording medium 50 is rotated or translated.

Moreover, the optical system 10A of the holographic recording and reproducing apparatus 10 includes a pickup device (not shown) for performing controls with respect to the recording medium 50, including a focus-servo control, a tracking-servo control, and the like. The pickup device shares the objective lens 27 with the holographic optical system 10A. The pickup device detects a part of light reflected from the recording medium 50 and performs the focus-servo and tracking-servo controls based on the thus detected signal. Alternatively, a laser light source for positioning, that has a different wavelength from that of the laser light source 11 for hologram may be provided. In this case, laser light from the positioning laser light source may be introduced into an optical path of holographic light and then light obtained by reflection of the positioning laser light from the recording medium 50 may be received, so that the servo controls are performed.

The control for the optical system for holographic recording and reproducing, the control for the pickup optical system, and the servo controls mentioned above are performed by an optical system controller 34. The respective circuit blocks of the aforementioned holographic recording and reproducing apparatus 10, that include the optical system controller 34, are controlled by the main controller (CPU) 30 that is connected to those circuit blocks via a system bus 30A and controls the entire apparatus.

Then, the recording medium 50 and a recording operation and a reproducing operation of the holographic-recording and reproducing apparatus 10 will be described in detail.

The recording medium 50 has a disc shape, card shape, or the like. However, the shape of the recording medium 50 is not limited thereto. In the following description, an example is described in which holographic multiplexing recording and reproduction is performed while the recording medium 50 in the form of a disc is secured to a spindle motor and being rotated at a predetermined speed.

Figure 3:
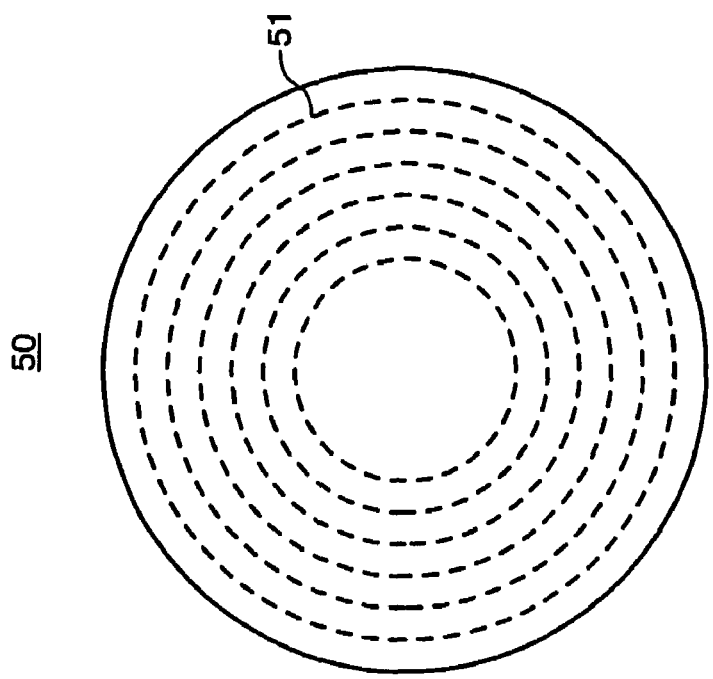
FIG. 3 shows a plan view of a recording medium according to the present invention.
Figure 4:
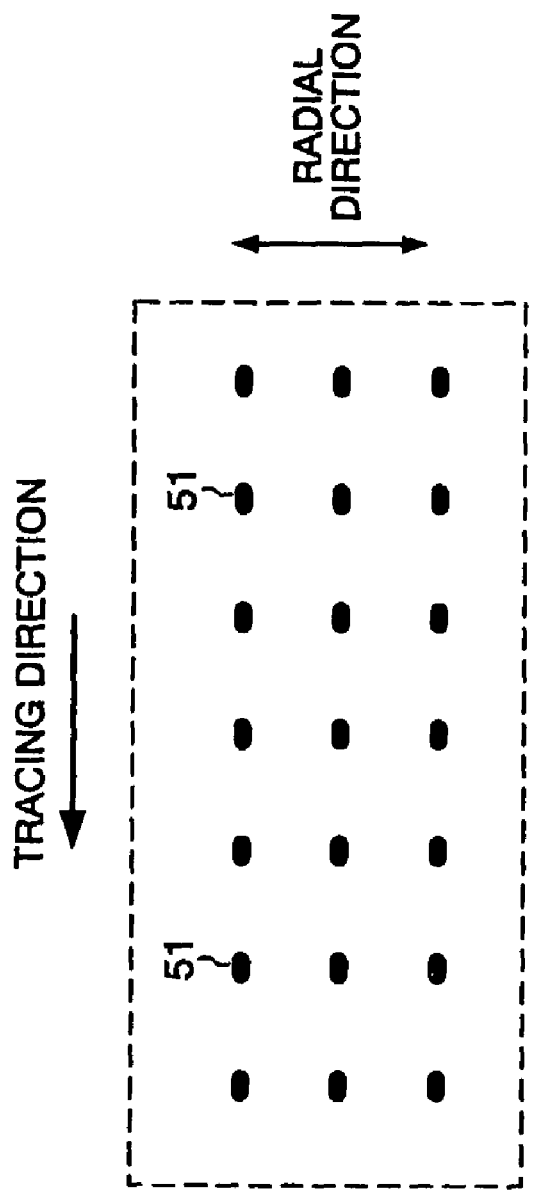
FIG. 4 shows a partial plan view of the recording medium shown in FIG. 3.
Figure 5:
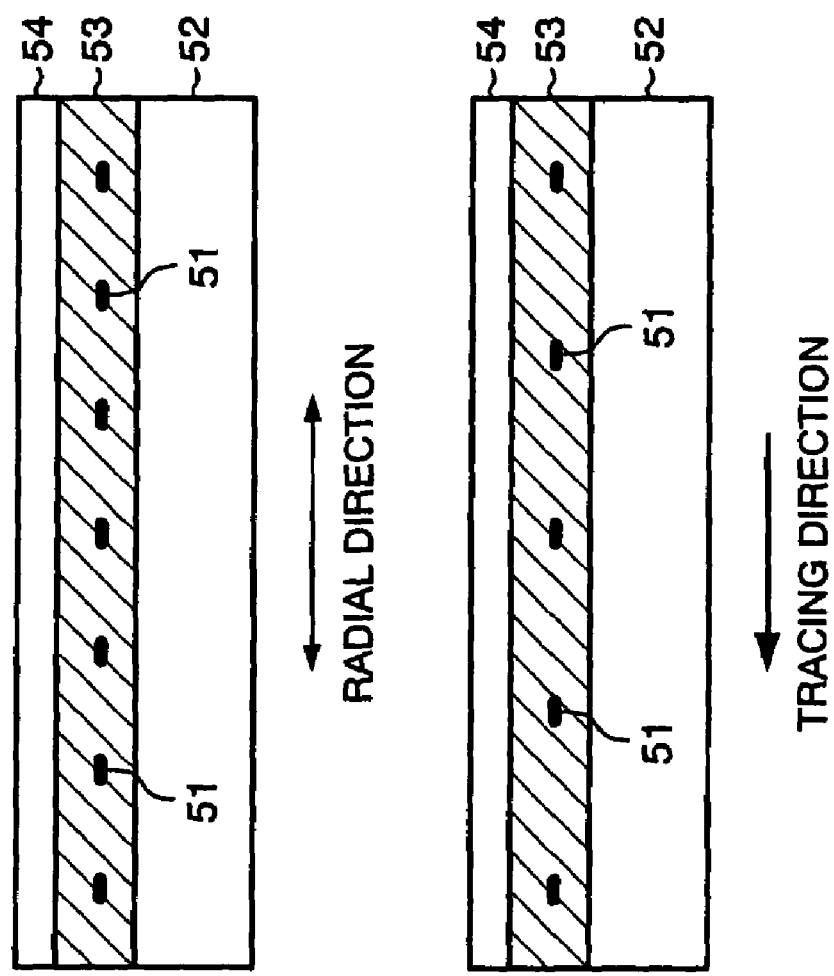
FIG. 5 shows cross-sectional views of a part of the recording medium shown in FIG. 3, in a radial direction and in a tracing direction.

FIGS. 3, 4, and 5 show a plan view, a partial plan view and a cross-sectional view of the recording medium 50, respectively. The recording medium 50 has a disc shape, and a plurality of markers 51 are arranged concentrically or spirally in the recording medium 50 so as to form recording tracks, as shown in FIGS. 3 and 5. Thus, the focus-servo and tracking-servo controls can be performed sequentially by using the markers 51 along the makers 51. More specifically, as shown in FIG. 5, the recording medium 50 includes a substrate 52 formed of a resin, glass or the like, a recording layer 53 formed of a photosensitive material, and a protection layer 54 formed of a resin or the like that are formed on the substrate 52 in that order. As the material for the recording layer, a photosensitive material such as polymer, or single-crystal lithium niobate that is a photorefractive material, is used. The markers 51 are buried in the recording layer 53.

In recording or reproduction, as shown in FIG. 4, a servo control mechanism of the aforementioned pickup device performs focus-servo and tracking-servo operations so as to trace the recording track in a tangential direction (tracing direction) based on light reflected from the marker 51.

In the present embodiment, a case will be described where the servo controls are performed by using laser light for hologram. Even in such a case, recording and reproduction can be performed satisfactorily because the positions of the markers 51 are different from the position of the interference pattern in a depth direction. Moreover, in a case where the interference pattern is recorded so as to avoid the markers 51, as described below, it is not necessary to consider adverse effects of reflection from the markers 51. Alternatively, the adverse effects of reflection from the markers 51 can be avoided by setting a reflectance of the marker 51 with respect to the laser light for hologram within a range in which the servo controls can be performed.

In a case where the pickup device has a positioning laser light source having a different wavelength from the laser light source 11 for hologram to perform the servo controls by receiving positioning laser light reflected from the recording medium 50, the marker 51 can be formed in such a manner that it has a transmittance of a predetermined value or more with respect to the laser light for hologram while having a reflectance with respect to the positioning laser light. In order to achieve this, for example, the marker 51 may be formed from a material that is transparent with respect to the laser light for hologram and has a reflectance with respect to the positioning laser light. Alternatively, the marker 51 may be formed to have a phase structure, and a phase depth of the marker 51 may be set to a depth that is an integral multiple of the wavelength used as the signal light or reference light but is not an integral multiple of the wavelength of the positioning laser light. By forming the marker 51 in this manner, the marker 51 does not affect on recording and reproduction of hologram even if it is buried in the recording layer 53.

In the present embodiment, as shown in FIG. 2, reproduction light generated by the optical interference pattern is obtained on the side of incidence of the reference light 12B. Thus, in reproduction, in order to make the reference light 12B incident on the recording medium 50 and obtain the reproduction light by the recorded optical interference pattern by means of the objective lens 27, a relative refractive index of the substrate 52 with respect to the recording layer 53 is determined so that the substrate 52 has a predetermined reflectance with respect to the reference light 12B. That is, at least a part of the reproduction light is reflected from the recording medium 50 and the reflected light is received by the photodetector 20, thereby the recorded data can be reproduced. Instead of providing the substrate 52 with a difference of the refractive indices, a layer may be provided between the recording layer 53 and the substrate 52 separately, which has a refractive index allowing the reproduction light to be reflected.

Figure 6:
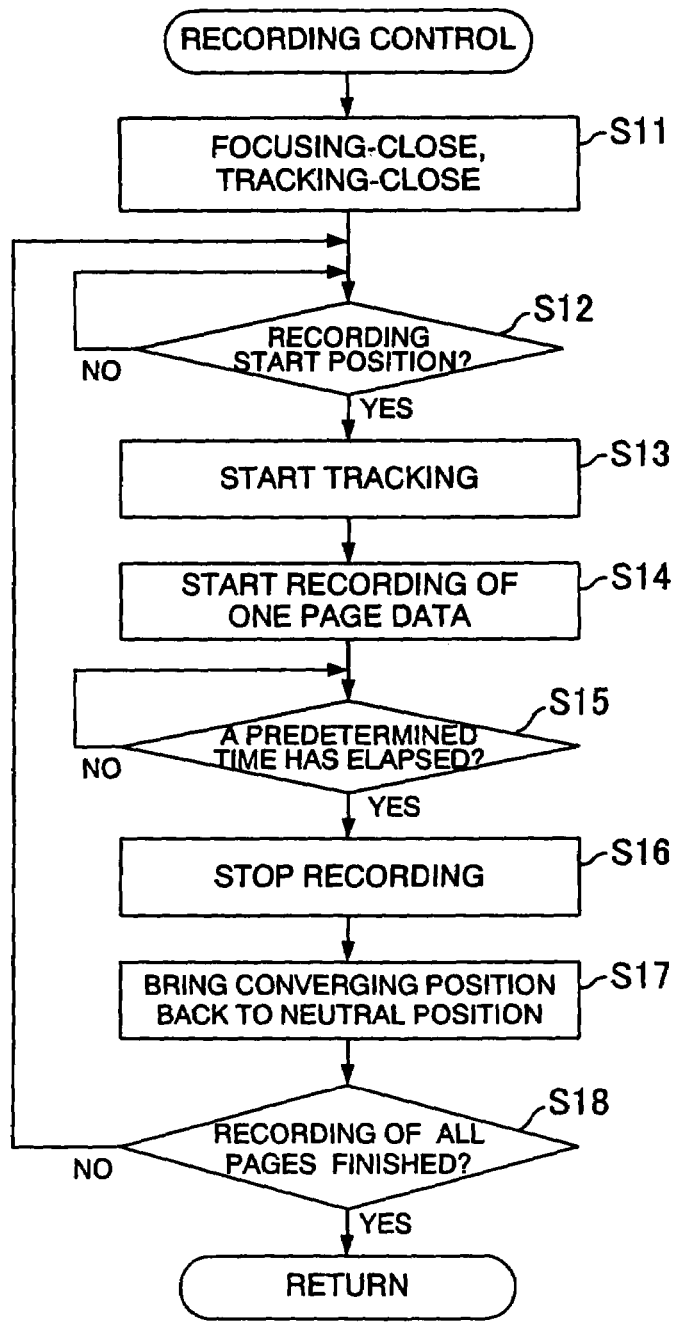
FIG. 6 is a flowchart of a procedure of a holographic recording operation of the holographic recording and/or reproducing apparatus according to the first embodiment of the present invention.

With reference to a flowchart shown in FIG. 6, and FIGS. 7 and 8, a holographic recording operation will be described. The recording operation is performed under a control of the main controller (CPU) 30.

First, the pickup device performs focusing-close and tracking-close at a predetermined track (Step S11). While performing focus-servo and tracking-servo controls using reflected light from the marker 51, the pickup device sends a detection signal of the marker 51 to the main controller 30. The main controller 30 determines whether or not a converging position of the objective lens 27 reached to a marker 51 at a recording start position (Step S12). When it was determined that the converging position reached the marker 51 at the recording start position, the main controller 30 starts a tracing operation in such a manner that the converging position of the objective lens 27 is fixed to that marker 51, i.e., a relative velocity of the converging position with respect to the recording medium in a direction along the recording track becomes substantially zero, at the same time as the time when the converging position has reached the marker 51 (M1 in FIG. 8, Step S13).

Figure 7:
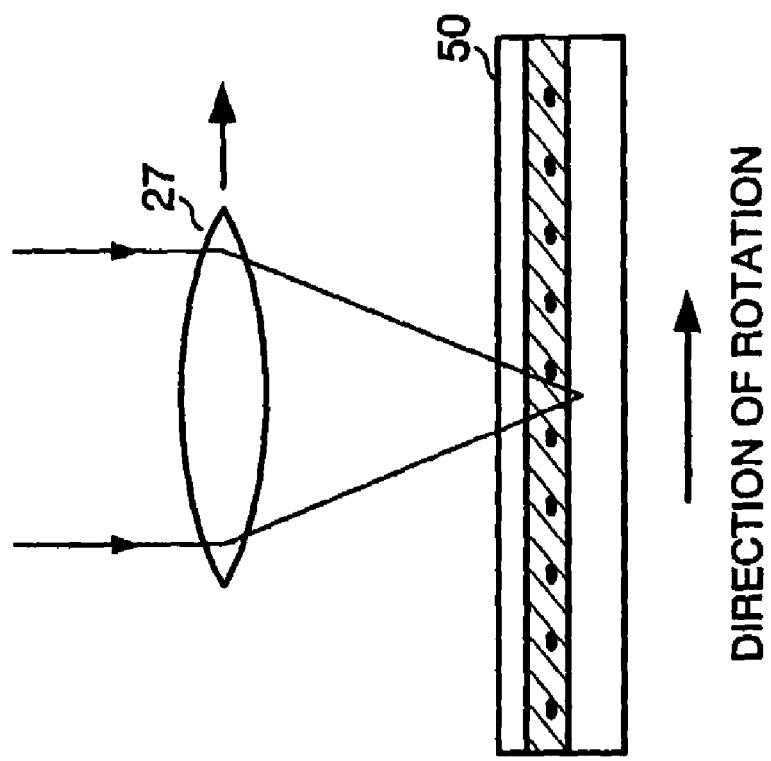
FIG. 7 is a diagram illustrating a moving direction of the recording medium and a tracking operation of a converging position of an objective lens by driving the objective lens.

More specifically, as shown in FIG. 7, the objective lens driver 32 drives the objective lens 27 in a direction of rotation (tangential direction) of a recording medium 50 in the form of a disc, i.e., a direction opposite to the tracing direction, so as to fix the converging position of the objective lens 27 to the same position (i.e., recording. position) on a track, under the control by the main controller 30. In other words, the objective lens driver 32 moves the converging position of the objective lens 27 at the same velocity as the linear velocity of the recording medium 50 in the same direction as the recording medium 50.

Figure 8:
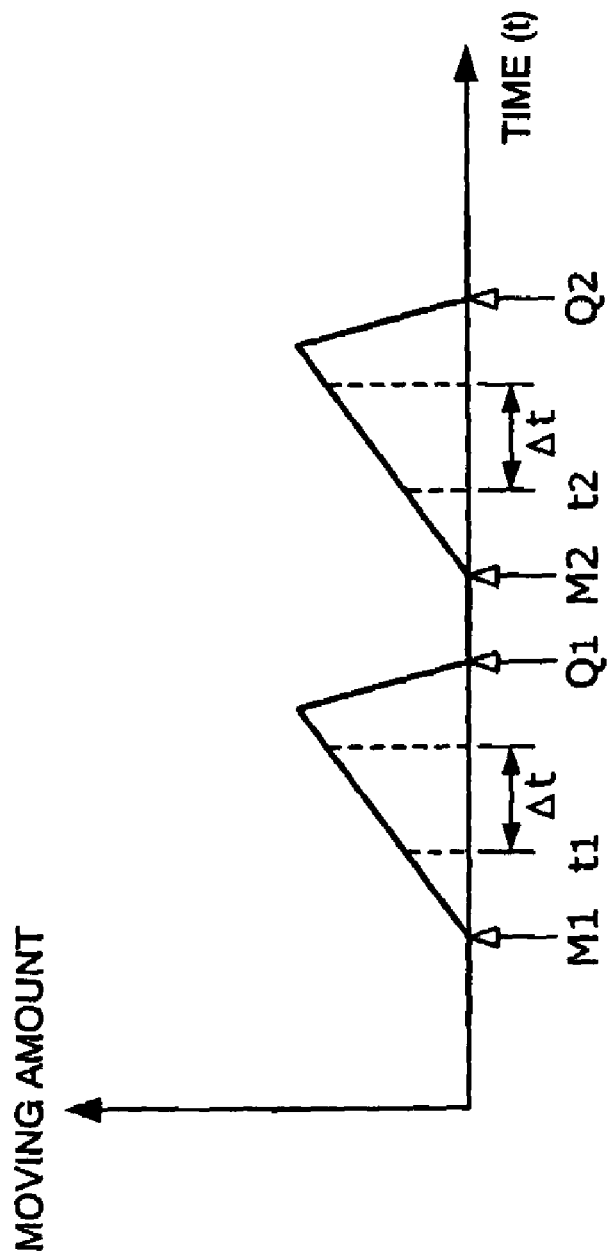
FIG. 8 is a diagram illustrating a moving amount of the objective lens, a control method for controlling the movement of the objective lens and a recording operation in tracking recording.

As shown in FIG. 8, from a time t1 that is a time after a predetermined time passed after the start of the tracking operation, the signal light 12A and the reference light 12B are introduced into the recording medium 50, so that recording is started (Step S14). Then, it is determined whether or not a predetermined time ($\Delta t$) which is required for the recording, has elapsed from the time t1 (Step S15). When it was determined that the predetermined time ($\Delta t$) had elapsed, the signal light 12A and the reference light 12B are blocked at a time when the predetermined time ($\Delta t$) elapsed, thereby the recording is stopped (Step S16). In this manner, data of one page is recorded. After the recording was stopped, the objective lens driver 32 brings the converging position of the objective lens 27 back to its original neutral position or reference position (Q1 in FIG. 8, Step S17).

Then, it is determined whether or not recording of data of all pages to be recorded was finished (Step S18). When reproducing of the data of all pages has not been finished yet, the control routine goes back to Step S12 and the above-described steps are repeated so as to record data of the next page. When recording of the data of all pages was finished, the control routine is finished. In this manner, holographic recording is performed.

In reproduction, an operation similar to the tracking operation in the recording mentioned above is performed, thereby the recorded page data is reproduced.

In the above description, a case was described in which the tracking operation was performed so as to make the relative velocity of the converging position with respect to the recording medium in the direction along the recording track substantially equal to zero. However, the tracking operation may be performed to make the relative velocity of the converging position of the objective lens with respect to the marker 51 fall within a predetermined range and recording or reproduction can be achieved while the relative velocity is in the predetermined range.

In other words, even if the converging position is not completely fixed on the recording medium, recording or reproduction can be achieved well as long as the relative velocity of the converging position with respect to the recording medium falls within the predetermined range during a period in which the recording or reproduction is performed. More specifically, in a case where a position at which the signal light and the reference light are converged (i.e., interference position) is completely fixed with respect to the recording medium during a period of recording of one page data, interference fringes generated by the signal light and the reference light do not move. Therefore, a refractive index distribution that reflects the interference fringes as they are is generated at that recording position on the recording medium. However, when the interference position of the signal light and the reference light relatively moved with respect to the recording medium during the recording period of one page data (the movement is not limited to movement along the recording track), the interference fringes generated by the signal light and the reference light are shifted from the recording position on the recording medium. Thus, a degree of modulation of the refractive index distribution generated becomes lower. In a case where the interference position of the signal light and the reference light moves linearly by a distance corresponding to one period of the interference fringes relatively with respect to the recording medium during a predetermined period, for example, a period from the start of that recording period to the end thereof, the refractive index distribution generated becomes substantially uniform and therefore signals cannot be detected.

As described above, when the interference position moved relatively with respect to the recording medium during a predetermined period (i.e., the recording period of one page data), an S/N ratio of a detection signal is degraded because of decrease in modulation of the refractive index distribution. Depending on an allowable range of degradation of the S/N ratio, a range of relative movement of the interference position with respect to the recording medium, i.e., a range of the relative velocity of the interference position with respect to the recording medium can be determined. For example, in a case where the interference position linearly moves by a distance corresponding to a ½ period (50%) of the pitch of the interference fringes relatively during the recording period of data of one page, the degree of modulation of the refractive index distribution decreases to approximately 60% of that in a case where the interference position does not move. If the decrease of the S/N ratio could be controlled to such a level, recording or reproduction can be achieved with sufficient detection sensitivity in a detection system containing the photodetector 20, and this is preferable. Moreover, in a case where the interference position linearly moves by a distance corresponding to 70% of the pitch of the interference fringes relatively, the degree of modulation decreases to approximately 30% of that in the case where the interference position does not move. If the decrease of the S/N ratio could be suppressed to this level, recording or reproduction can be achieved well without making the detection system and the like, more complicated and causing the increase of the fabrication cost. Note that, in a case where the interference position moves linearly with respect to the recording medium, the relative velocity of the interference position with respect to the recording medium can be obtained simply by dividing a relative moving distance mentioned above, that is acceptable, by the predetermined time period.

By the aforementioned tracking operation, holographic recording and reproduction can be achieved well, while the recording medium 50 is rotated continuously.

Although recording is performed for a region above the plane position of the respective markers 51, i.e., a region shallower than the markers 51 in the above-described embodiment, it may be performed for a region between the markers 51 so as to avoid the region above the markers 51. In a case of performing such a tracking operation, various methods can be used, such as a method in which the objective lens 27 is moved with an offset corresponding to a shift amount from the position of the marker 51, a method in which a tracking operation with respect to the marker 51 is performed in advance so as to obtain a driving condition of the objective lens 27, or a method in which a moving velocity of the marker 51 is calculated and the objective lens 27 is moved in accordance with the thus calculated velocity. Moreover, in this case, a control may be performed in such a manner that data of one page or a plurality of pages is recorded between adjacent markers 51.

When tracking the marker by using positioning laser light having a different wavelength from laser light for hologram, it is possible to shift a position onto which the positioning laser light is converged and a position onto which the laser light for hologram is converged away from each other in a plane by a certain distance, thereby preventing the marker from affecting the laser light for hologram.

Figure 9:
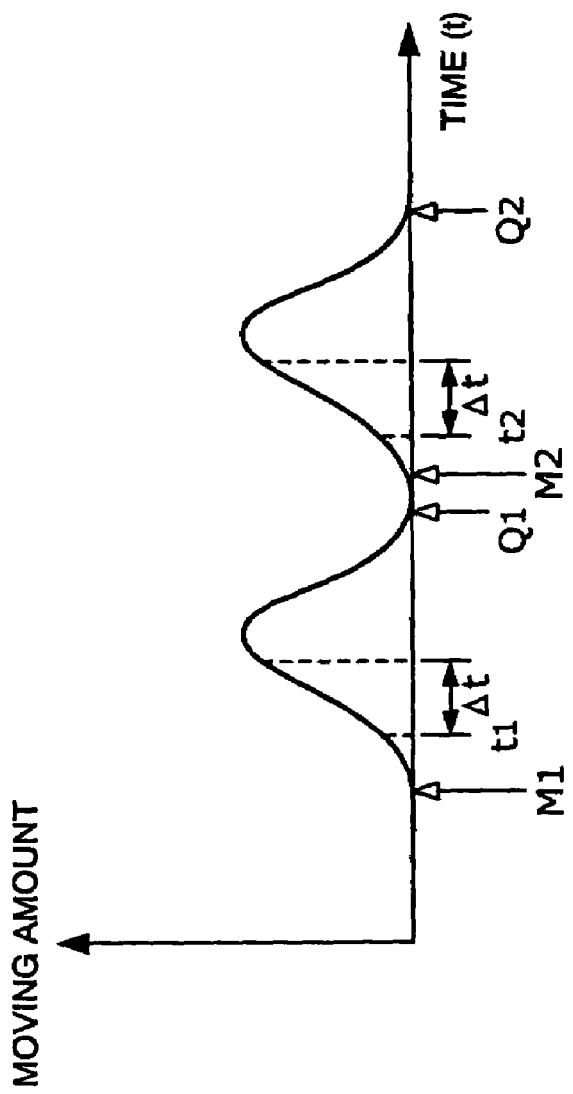
FIG. 9 is a diagram illustrating the control method for controlling the movement of the objective lens and the recording operation in a similar manner to FIG. 8.

In addition, the control for the moving amount of the objective lens 27 is not limited to a profile shown in FIG. 8. For example, as shown in FIG. 9, the operation may be controlled so as to perform recording in a region in which the moving amount of the objective lens is substantially linear.

Second Embodiment

Figure 10:
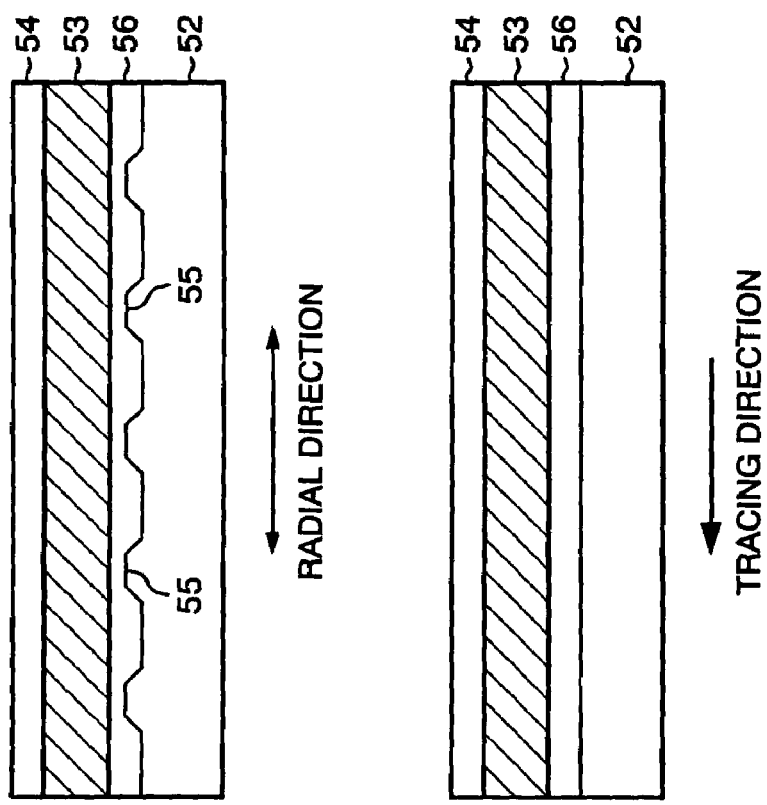
FIG. 10 shows cross-sectional views of a recording medium in a radial direction and a tracing direction, that can be used in a holographic recording and/or reproducing apparatus according to a second embodiment of the present invention.
Figure 11:
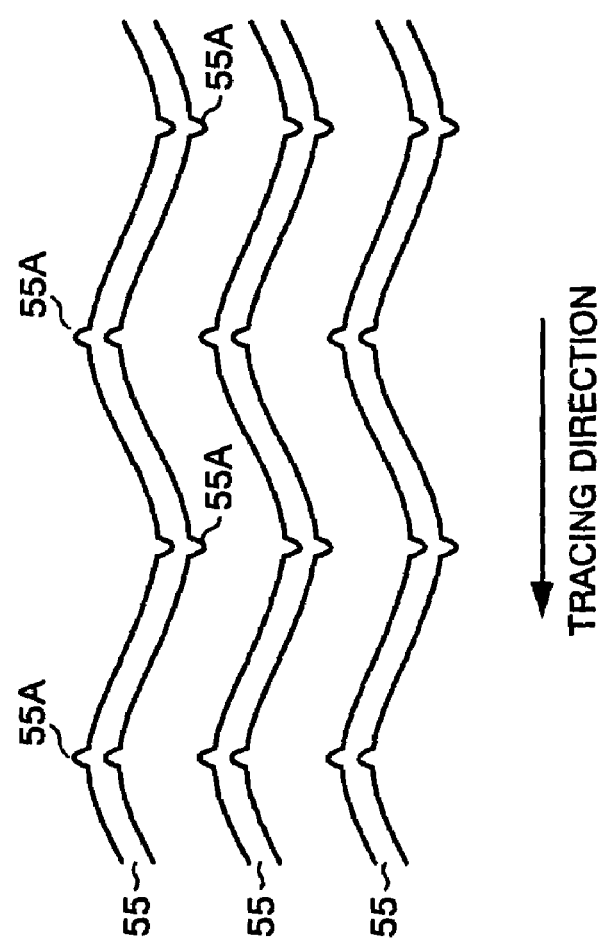
FIG. 11 shows a plan view of the recording medium that can be used in the holographic recording and reproducing apparatus according to the second embodiment of the present invention.

FIGS. 10 and 11 respectively show cross-sectional views and a plan view of a recording medium 50 used in a holographic recording and/or reproducing apparatus 10 according to a second embodiment of the present invention.

The recording medium 50 of the embodiment includes a burying layer 56 formed on a resin substrate 52 on which grooves 55 are formed. The burying layer 56 is formed of a resin having a refractive index different from that of the substrate 52. On the burying layer 56, a holographic recording layer 53 formed of $LiNbO_3$ crystal with Fe added thereto, for example, and a protection layer 54 made of a resin are formed in that order. Since the burying layer 56 has a different refractive index from the substrate 52, it is possible to perform focus-servo and tracking-servo controls by using the laser light for hologram.

More specifically, as shown in the plan view of FIG. 11, the groove 55 is formed to wobble, and marker portions 55A in the form of projections are further formed so as to correspond to a wobbling period. A pickup device provided in the holographic recording and reproducing apparatus 10 can perform the focus-servo and tracking-servo controls by using those grooves 55 and can perform a tracking operation in a similar manner to that in the first embodiment, in response to detection of the marker portions 55A.

Figure 12:
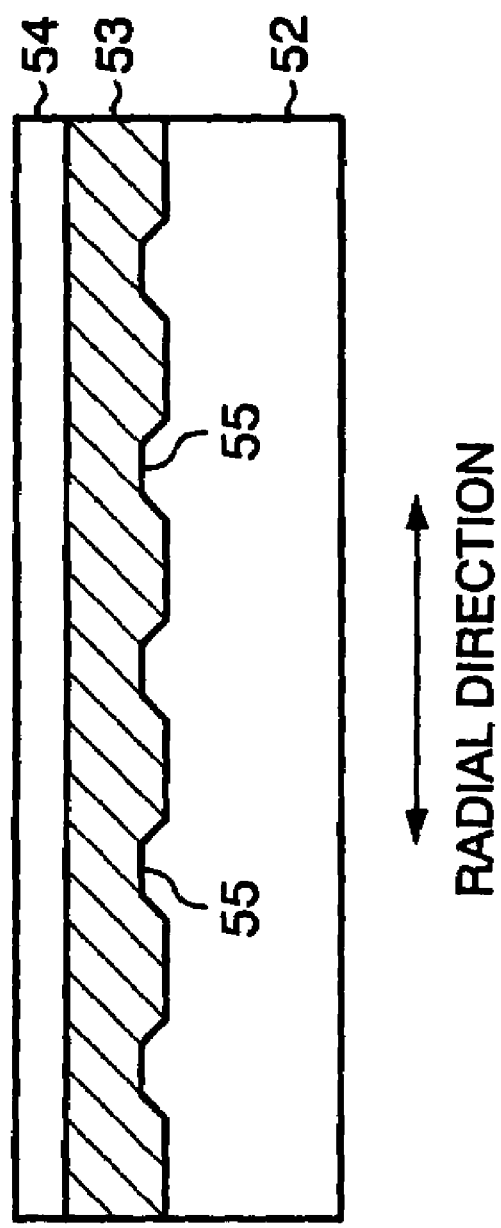
FIG. 12 shows a cross-sectional view of the recording medium in the radial direction, that is provided with a groove structure in a lower portion of a recording layer.

In a case where the pickup device includes a laser light source of a different wavelength from the laser light source 11 for hologram and performs the servo control by receiving light obtained by reflection of positioning laser light from the recording medium 50, the same grooves 55 as those mentioned above may be formed in a lower portion (a portion closer to the substrate 52) of the holographic recording layer 53, as shown in a cross-sectional view of FIG. 12. In other words, the recording medium 50 can be formed in such a manner that only the positioning laser light is affected by the grooves 55 depending on the wavelengths of the laser light for hologram and the positioning laser light. In this case, holographic recording and reproduction cannot be affected adversely.

Third Embodiment

Figure 13:
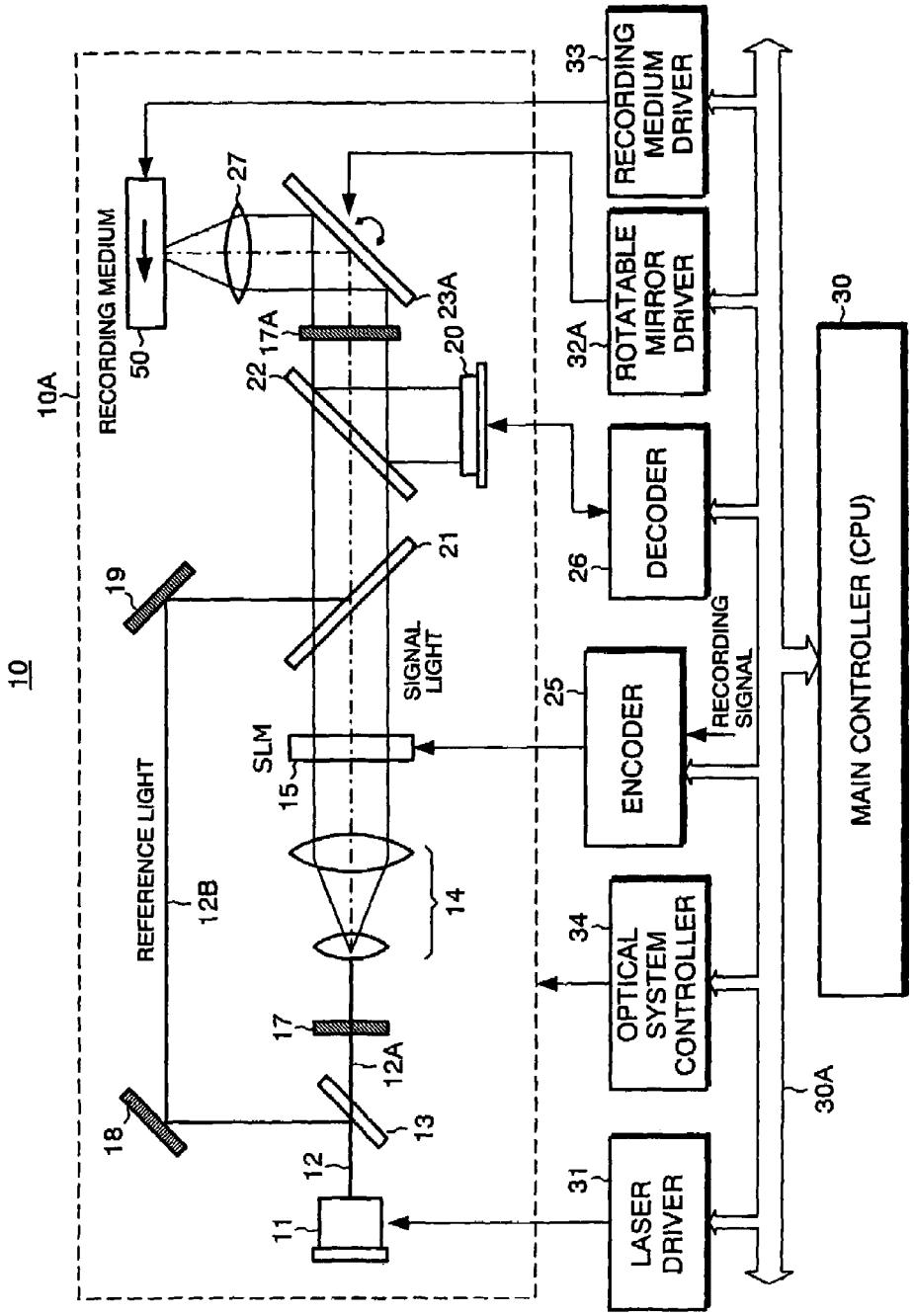
FIG. 13 is a block diagram of a structure of a holographic recording and reproducing apparatus according to a third embodiment of the present invention.

FIG. 13 is a block diagram of a holographic recording and/or reproducing apparatus 10 according to a third embodiment of the present invention. The present embodiment is different from the first embodiment in that the mirror 23 in the optical system 10A in the first embodiment is replaced with a rotatable mirror 23A. That is, the rotatable mirror 23A is driven by a rotatable mirror driver 32A to rotate. The rotation of the rotatable mirror 23A is controlled by the main controller 30. By this structure, a tracking operation similar to that performed in the first embodiment is achieved. A holographic recording operation of the holographic recording and reproducing apparatus 10 of the present embodiment will be described below. Please note that the recording operation is performed under the control of the main controller 30.

Figure 14:
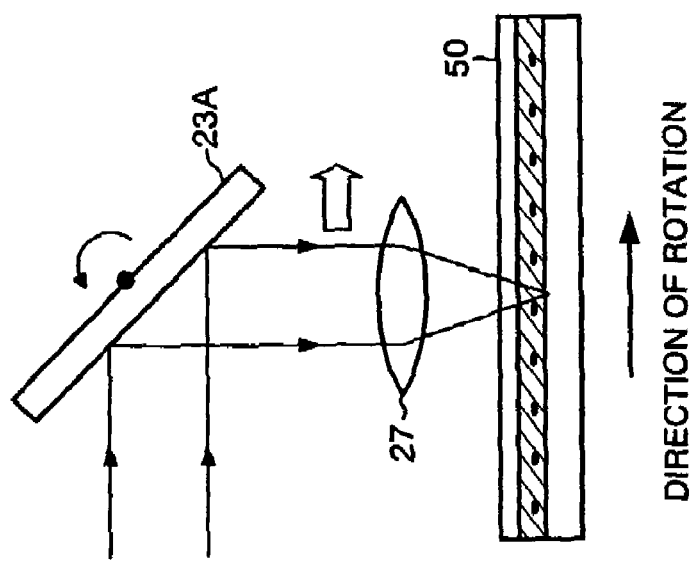
FIG. 14 is a diagram illustrating the moving direction of the recording medium and the tracking operation of the converging position by rotation of a rotatable mirror.

As shown in FIG. 14, a relative position of the signal light beam 12A and the recording reference light beam 12B with respect to the objective lens 27 is changed by the rotation of the rotatable mirror 23A. Thus, by rotating the rotatable mirror 23A to shift those beams in a direction of rotation of the recording medium 50 in the form of a disc, the tracking operation can be performed so as to make a relative velocity of the converging position of the objective lens with respect to the recording medium in a direction along the recording track substantially equal to zero. More specifically, the rotatable mirror driver 23A rotates the rotatable mirror 23A in such a manner that the converging position of the objective lens 27 moves at the same velocity as the linear velocity of the recording medium 50 in the same direction as the recording medium 50, thereby shifting the relative position of the signal light 12A and the recording reference light 12B with respect to the objective lens 27.

Similarly to the first embodiment, during a predetermined recording period ($\Delta t$) of a period in which the relative velocity of the converging position with respect to the recording medium in the direction along the recording track is made to be substantially zero by the above tracking operation, the signal light 12A and the reference light 12B are directed into the recording medium 50, so that holographic recording is performed. In reproduction, during a predetermined reproducing period ($\Delta t'$) of a period in which the relative velocity of the converging position with respect to the recording medium in the direction along the recording medium is substantially zero, the reference light 12B is also directed into the recording medium 50, so that holographic reproduction is performed.

After recording or reproduction of data of one page was finished, the rotatable mirror 23A is brought back to its initial position (reference position), and then the aforementioned procedure is repeated so as to record or reproduce data of the next page. Note that the optical path is blocked, for example, by a shutter 17A while the rotatable mirror 23A is brought back to its initial position, because reflected light of the signal light 12A and the reference light 12B is disturbed.

By the tracking operation mentioned above, holographic recording and reproduction can be achieved well while the recording medium 50 is rotated continuously.

It should be noted that the amount of tilt of the optical axis is significantly small and therefore adverse effects such as aberration caused by the aforementioned beam shift do not matter.

Fourth Embodiment

Figure 15:
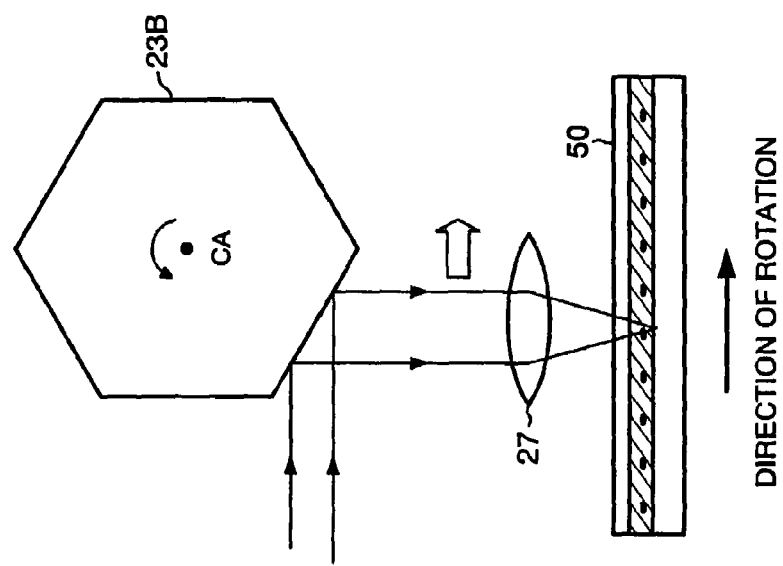
FIG. 15 is a schematic diagram showing a converging optical system in a holographic recording and reproducing apparatus according to a fourth embodiment of the present invention, that shows a tracking operation of a converging position by rotation of a polygon mirror.

FIG. 15 is a schematic diagram of a converging optical system of a holographic recording and/or reproducing apparatus 10 according to a fourth embodiment of the present invention. Except for the portion shown in FIG. 15, the holographic recording and reproducing apparatus has the same structure as that of the third embodiment.

In this embodiment, the rotatable mirror 23A in the third embodiment is replaced with a polygon mirror 23B. That is, the polygon mirror 23B is driven by the rotatable mirror driver 32A to rotate. The polygon mirror 23B is a regular polygon in a cross section perpendicular to a rotation center axis CA, and each side face is formed to be a mirror. For example, in a case where the shape in that cross section is a regular hexagon, as shown in FIG. 15, the polygon mirror 23B has six mirror side faces. Rotation of the polygon mirror 23B is controlled by the main controller 30 via the rotatable mirror driver.

By the above structure, a tracking operation similar to that performed in the third embodiment can be performed. A tracking recording operation of the holographic recording and reproducing apparatus 10 of the present embodiment will be described below.

Similarly to the operation in the third embodiment, the rotation of the polygon mirror 23B changes the relative position of the signal light 12A and the reference light beam 12B with respect to the objective lens 27. Thus, by rotating the polygon mirror 23B so as to shift the light beam in a direction of rotation of the recording medium 50 in the form of a disc, the tracking operation can be performed in such a manner that the relative velocity of the converging position of the objective lens with respect to the recording medium in the direction along the recording track becomes substantially zero. More specifically, the rotatable mirror driver 32A rotates the polygon mirror 23B in such a manner that the converging position of the objective lens 27 moves at the same velocity as the linear velocity of the recording medium 50 in the same direction as the recording medium 50, thereby shifting the relative position of the signal light 12A and the recording reference light 12B with respect to the objective lens 27.

The present embodiment is the same as the first and third embodiments in that holographic recording is performed during a predetermined period of a period in which the relative velocity of the converging position with respect to the recording medium in the direction along the recording medium is made to be substantially zero by the above-described tracking operation.

In the present embodiment, after recording or reproduction of data of one page was finished, the polygon mirror 23B is further rotated, so that recording of data of the next page can be performed promptly by using the next mirror side face. It is preferable to block the optical path of the signal light 12A and the reference light 12B, for example, by a shutter 17A, for example, while the mirror side face of the polygon mirror 12B is changed to the next one, because reflected light of the signal light 12A and the reference light 12B is disturbed.

It should be noted that the amount of tilt of the optical axis mentioned above is significantly small and therefore adverse effects such as aberration caused by the above-described beam shift do not matter.

Fifth Embodiment

In the embodiments described above, a case was described in which the recording medium 50 having the markers 51 was used and recording and reproduction were performed while the tracking control was performed based on the detection signal of the markers 51. However, the present invention can be applied to a recording medium having no markers.

In other words, the tracking control can be performed based on a signal from a motor or the like, for rotating, translating or the like, the recording medium 50. For example, the tracking operation can be performed based on a pulse signal generated in accordance with the amount of rotation of a spindle motor (i.e., an FG pulse) or a pulse signal from a stepping motor that depends on the moving amount. Alternatively, the tracking operation may be performed by using a signal from a driving circuit for driving the motor or the like, such as a recording medium driver 33, which depends on the rotation amount or moving amount of the recording medium.

Moreover, in accordance with various methods that are different from the method mentioned above, it is possible to determine the relative velocity of the converging position of the objective lens with respect to the recording medium in the direction along the recording track. For example, various detection signals detected by the pickup device can be used. For example, in a case of using a recording medium including a groove or the like that represents a recording track, and a pre-pit for carrying address information for recognition of a position on the groove track and information for synchronization, the relative velocity can be determined based on the pre-pit information obtained from the recording medium. Furthermore, those detection signals can be combined with the signal from the driving device that depends on the rotation amount or moving amount of the recording medium.

The present embodiment is the same as the above embodiments in that holographic recording or reproduction is performed during a predetermined period of a period in which the relative velocity of the converging position with respect to the recording medium in the direction along the recording track is made to be substantially zero by the tracking recording control mentioned above. Thus, even if the recording medium has no markers, holographic recording and reproduction can be achieved well while the recording medium is rotated or moved.

Sixth Embodiment

Figure 16:
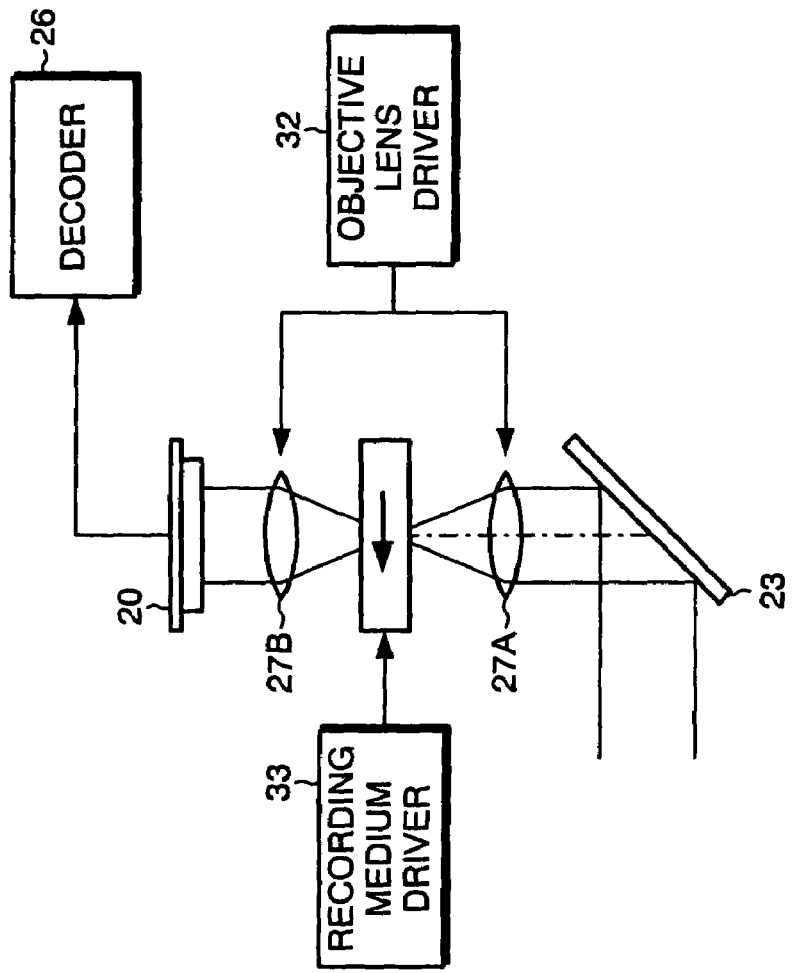
FIG. 16 is a block diagram showing a converging optical system and a driving circuit associated therewith of a holographic recording and reproducing apparatus according to a sixth embodiment of the present invention.

FIG. 16 is a block diagram of a converging optical system and a driving circuit associated therewith of a holographic recording and/or reproducing apparatus 10 according to a sixth embodiment of the present invention. Except for the above, the present embodiment has the same structure as that described in the first embodiment.

In the embodiment mentioned above, a case was described in which reproduction light reflected from the recording medium 50 was detected, so that recorded data was reproduced. In the present embodiment, the photodetector 20 is arranged on a side of the recording medium 50 that is opposite to the side on which the recording light 12A and the reference light 12B are incident. Thus, in reproduction, when the reference light 12B is made incident on the recording medium 50, reproduction light that reproduces a recorded optical interference pattern appears. By directing the reproduction light to a lens 27B to transform it by inverse Fourier transform, a dot pattern signal can be reconstructed. The dot pattern signal is received by the photodetector 20 such as a charge-coupled device (CCD) arranged at a focal distance of the lens and is then converted again into an electric digital data signal. After the conversion, the signal is sent to the decoder 26, so that the original data is reproduced.

In a case of the holographic recording and reproducing apparatus 10 including the above-described optical system, the structure of the recording medium 50 can be made simple.

In other words, it is not necessary to form the recording medium 50 to have a predetermined reflectance with respect to the reference light 12B.

Moreover, the tracking recording control can be performed in a similar manner to that described in the above embodiment. Holographic recording and reproduction can be achieved well while the recording medium is rotated or moved.

Other Embodiments

Recording media according to other embodiments of the present invention will be described below, with reference to the drawings.

Figure 17:
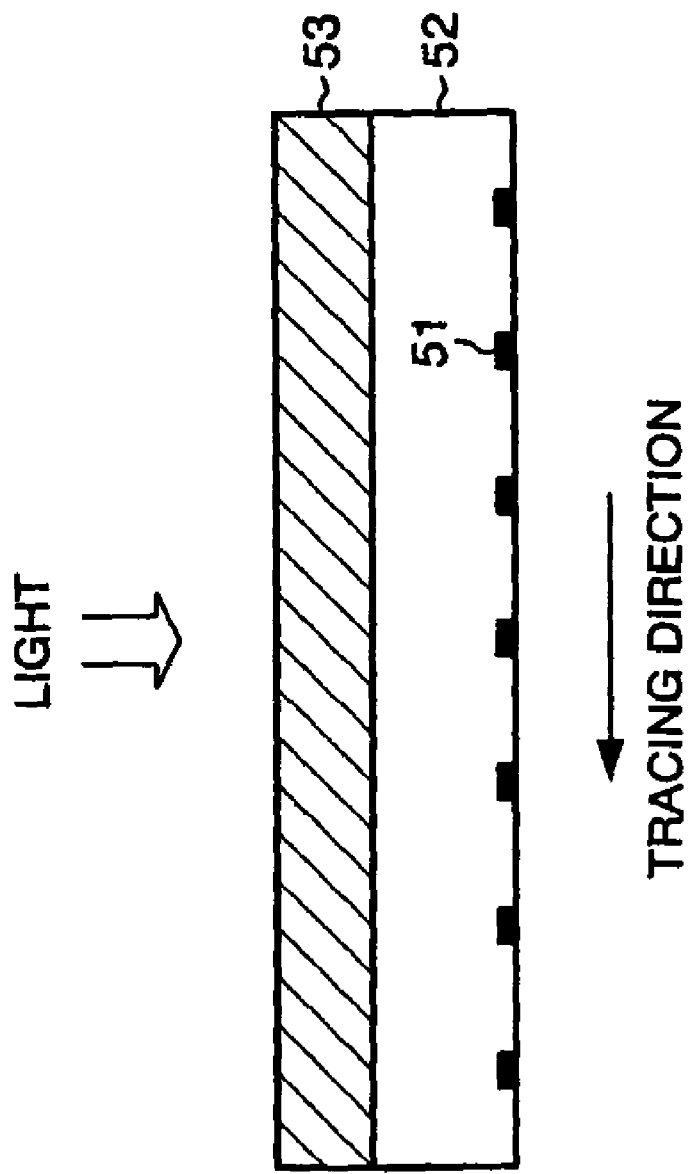
FIG. 17 shows a cross-sectional view of a portion of a recording medium in a tracing direction, according to another embodiment of the present invention.
Figure 18:
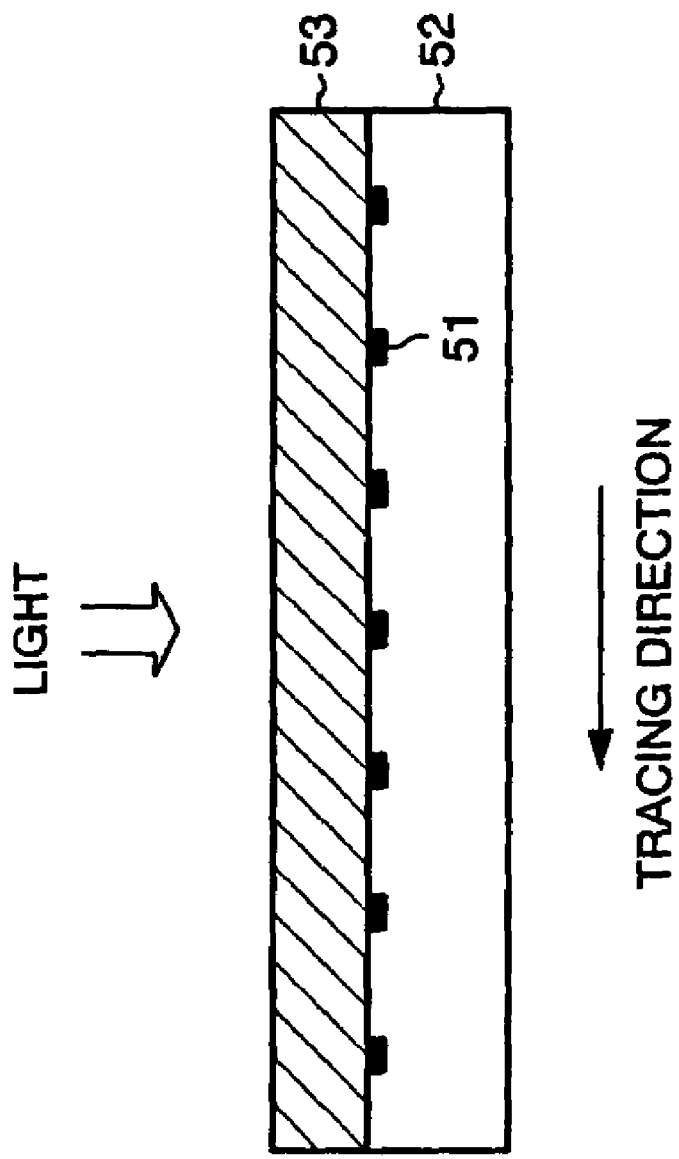
FIG. 18 shows a cross-sectional view of a portion of a recording medium in a tracing direction, according to another embodiment of the present invention.

The recording media of the present invention are not limited to those described in the above embodiments but can be modified or changed in various ways. For example, FIG. 17 shows a cross-sectional view of a portion of the recording medium 50 in the tracing direction. As shown in FIG. 17, the recording medium 50 includes a substrate 52 and a recording layer 53 formed of a photosensitive material to be adjacent to the substrate 52. Signal light and/or reference light is/are incident on the recording layer 53 side. Markers 51 are formed inside the substrate 52 on the bottom surface thereof. Alternatively, as shown in FIG. 18, the markers 51 are formed inside the substrate 52 on a surface thereof that is in contact with the recording layer 53. In other words, in these cases, the recording layer 53 is formed closer to the side of incidence of the signal light and/or the reference light than the markers 51.

Figure 19:
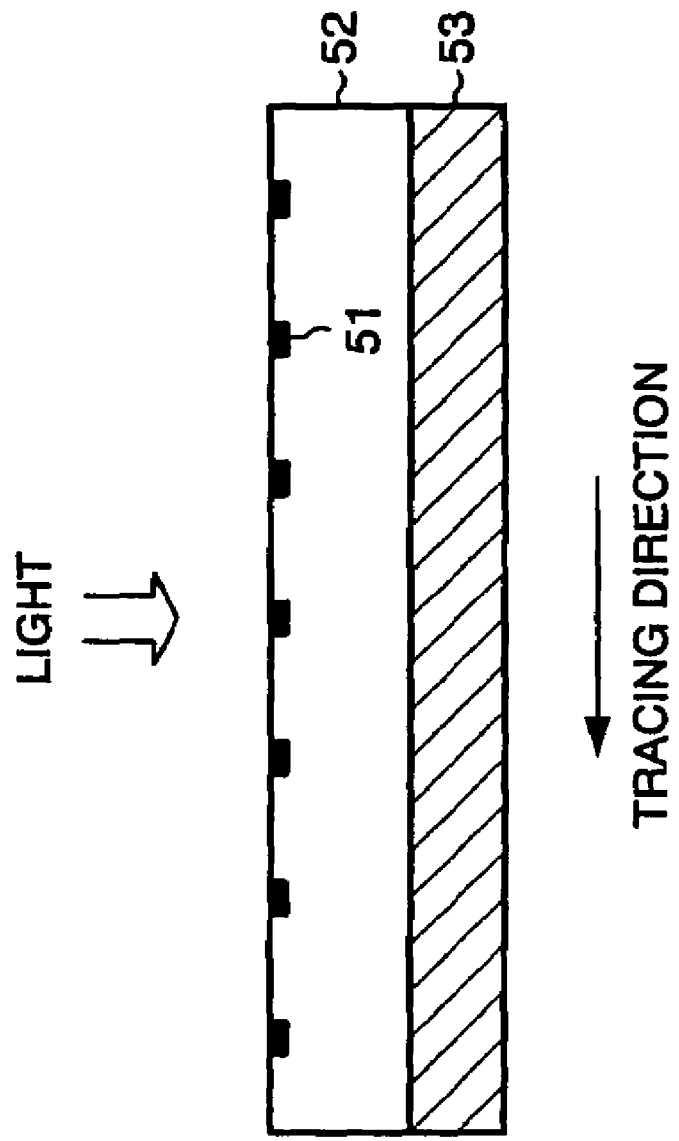
FIG. 19 shows a cross-sectional view of a portion of a recording medium in a tracing direction, according to another embodiment of the present invention.
Figure 20:
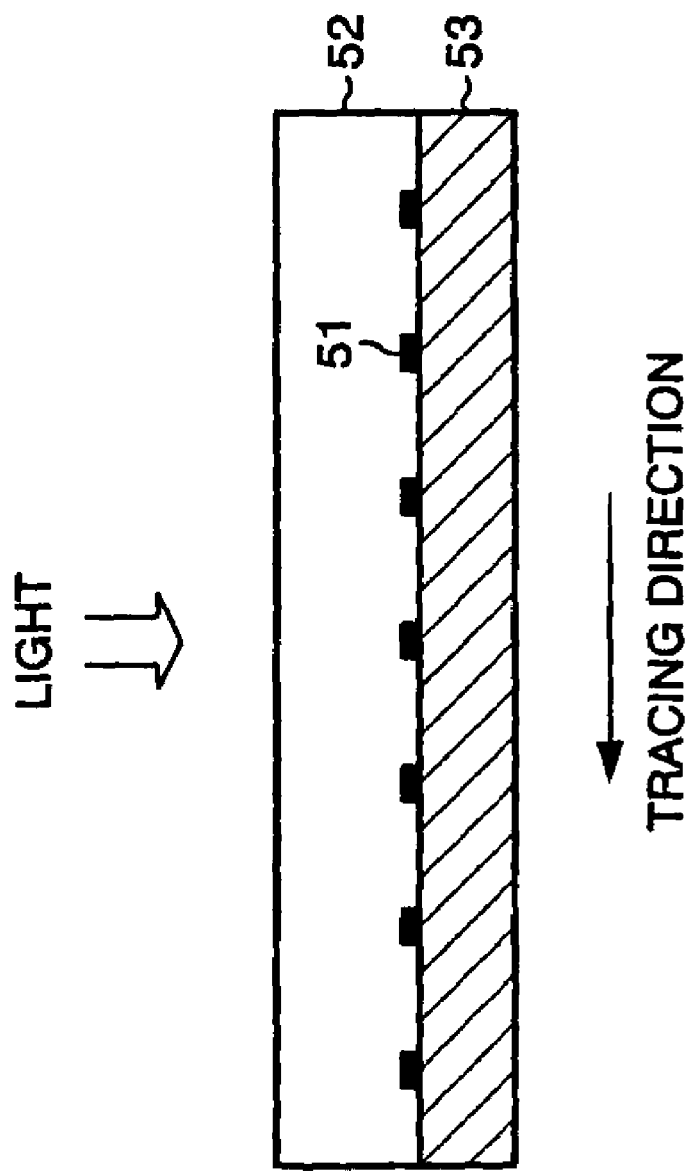
FIG. 20 shows a cross-sectional view of a portion of a recording medium in a tracing direction, according to another embodiment of the present invention.

Alternatively, as shown in FIGS. 19 and 20, signal light and/or reference light may be incident on the substrate 52 side of the recording medium, while the markers 51 are formed inside the substrate 52. In these cases, the markers 51 are formed closer to the incident side of the recording medium, on which the signal light and/or reference light is/are incident, than the recording layer 53. The markers 51 may be formed at any positions in a depth direction of the substrate 52, as long as they are inside the substrate 52. Moreover, the markers 51 may be provided on a boundary between the substrate 52 and the adjacent layer. For example, the markers 51 may be formed in the form of protrusions protruding from the substrate 52, or concave pits.

Figure 21:
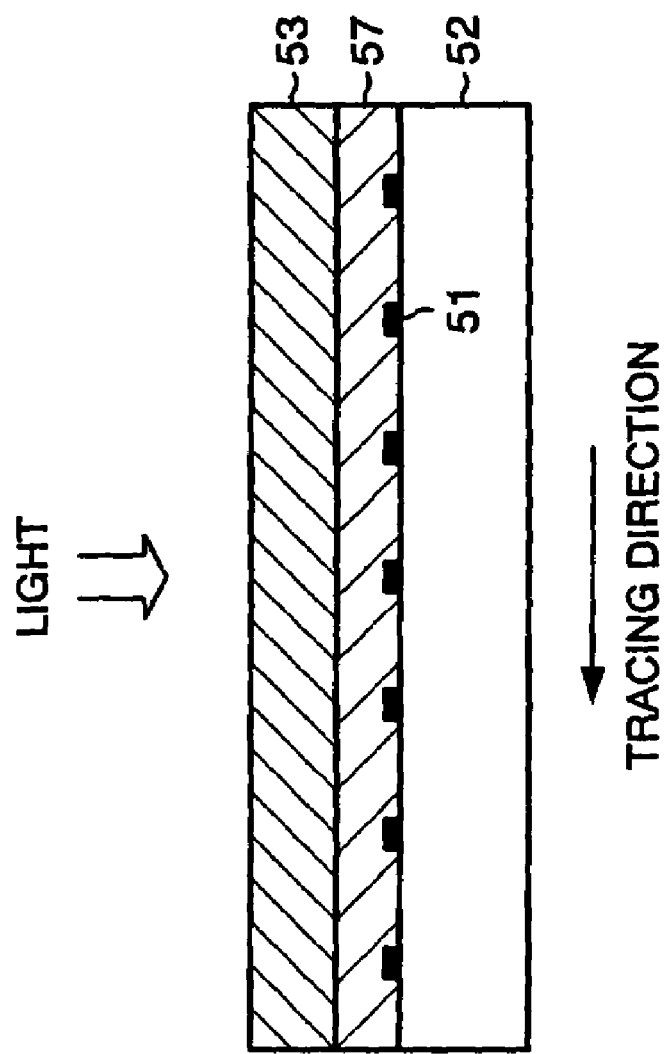
FIG. 21 shows a cross-sectional view of a portion of a recording medium in a tracing direction, according to another embodiment of the present invention.
Figure 22:
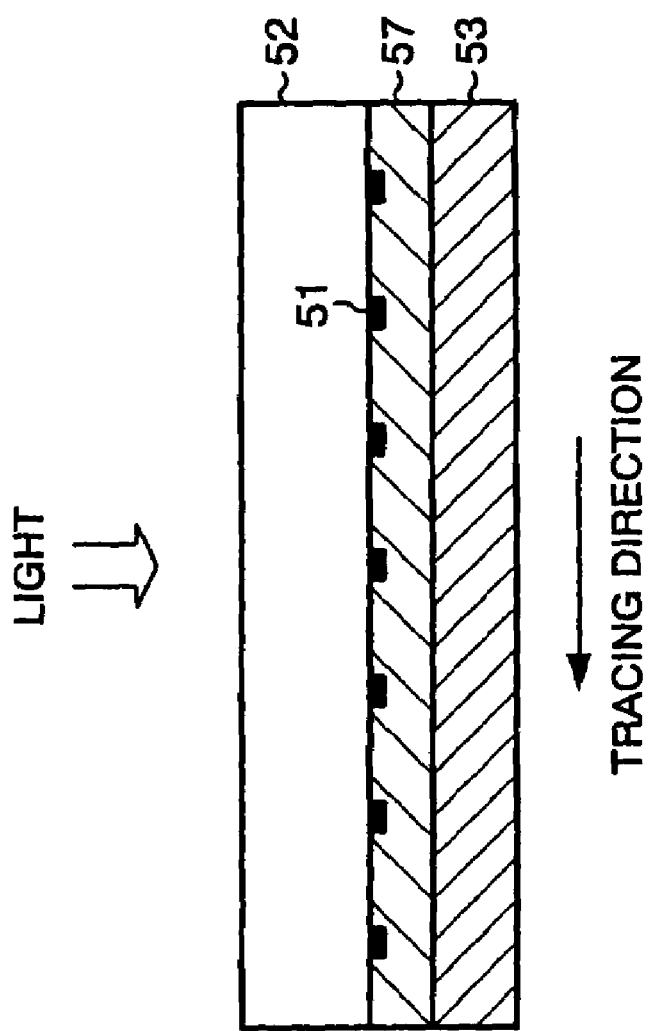
FIG. 22 shows a cross-sectional view of a portion of a recording medium in a tracing direction, according to another embodiment of the present invention.

In other embodiments, as shown in FIGS. 21 and 22, the recording medium 50 includes a substrate 52, a burying layer 57 for burying the substrate 52 to flatten it, which is formed to be adjacent to the substrate 52 and has a different refractive index from that of the substrate, and a recording layer 53 formed of a photosensitive material, adjacent to the burying layer 57. The markers 51 are formed in the burying layer 57. The recording layer 53 may be formed closer to the incident side of the recording medium, on which the signal light and/or reference light is/are incident, than the burying layer 57 including the marker 51, as shown in FIG. 21. Alternatively, the burying layer 57 including the markers 51 may be formed closer to the incident side of the recording medium, on which the signal light and/or reference light is/are incident, than the recording layer 53, as shown in FIG. 22. Please note that the markers 51 may be formed at any positions in a depth direction of the burying layer 57 as long as they are provided in the burying layer 57. A case where the markers 51 are provided on a boundary between the burying layer 57 and the adjacent layer or substrate is possible. For example, the markers 51 may be formed in the form of protrusions protruding from the burying layer 57, or concave pits.

Figure 23:
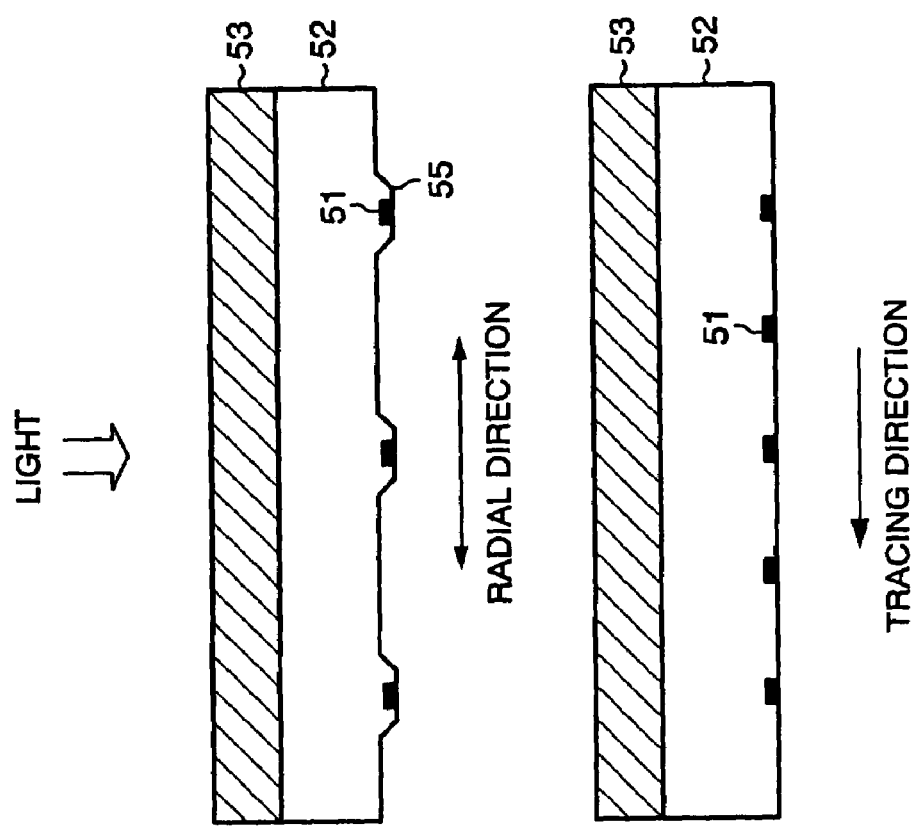
FIG. 23 shows cross-sectional views of a portion of a recording medium in a radial direction and a tracing direction, according to another embodiment of the present invention.
Figure 24:
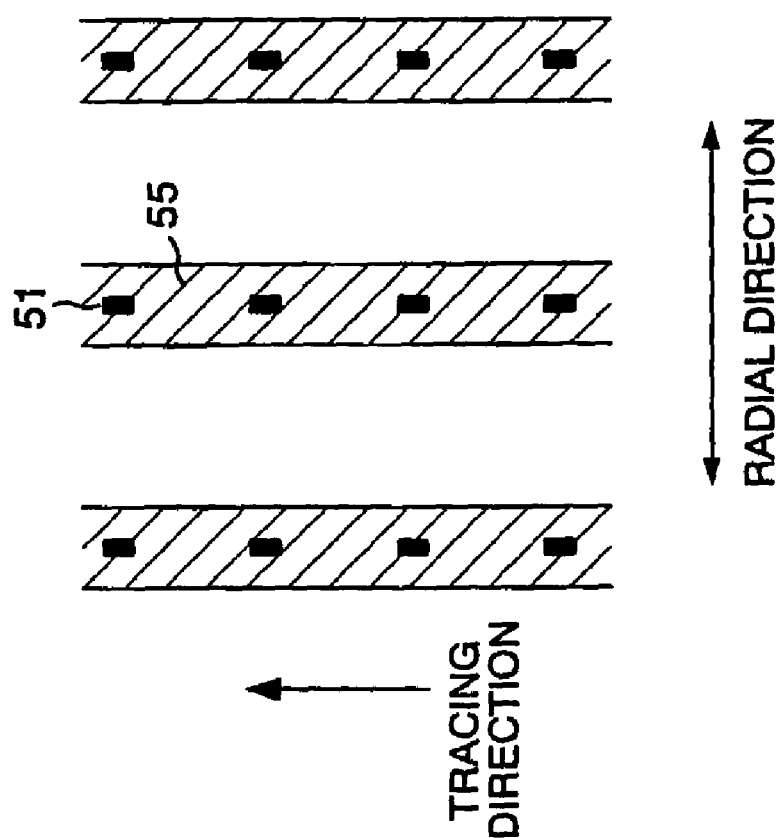
FIG. 24 shows a top view of the portion shown in FIG. 23.
Figure 25:
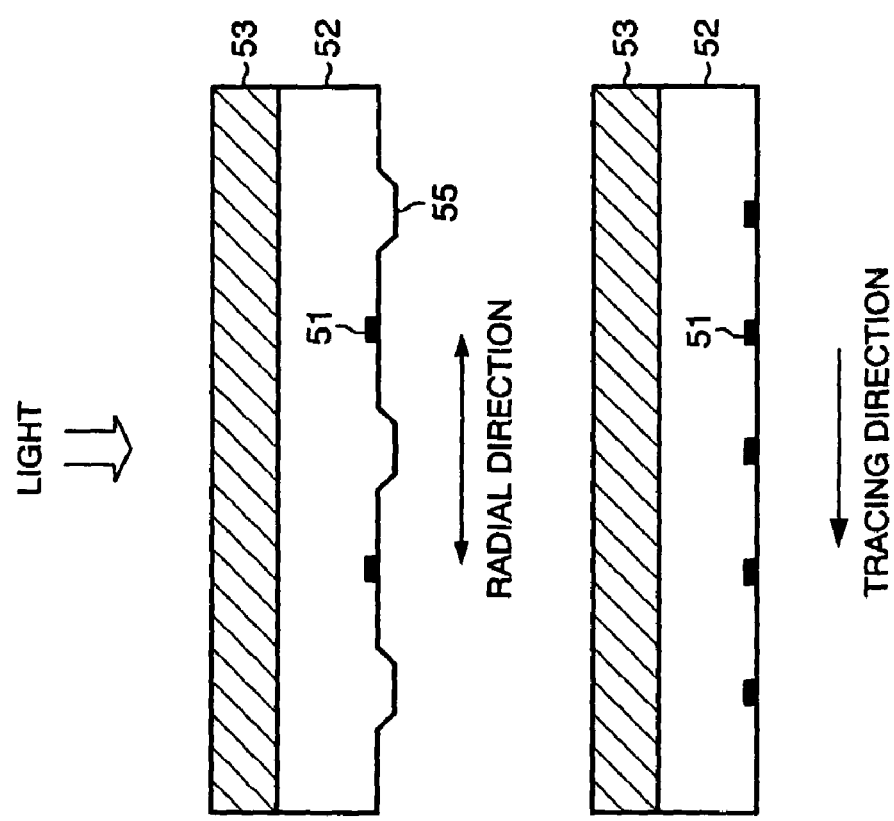
FIG. 25 shows cross-sectional views of a portion of a recording medium in a radial direction and a tracing direction, according to a modification of the embodiment shown in FIGS. 23 and 24.
Figure 26:
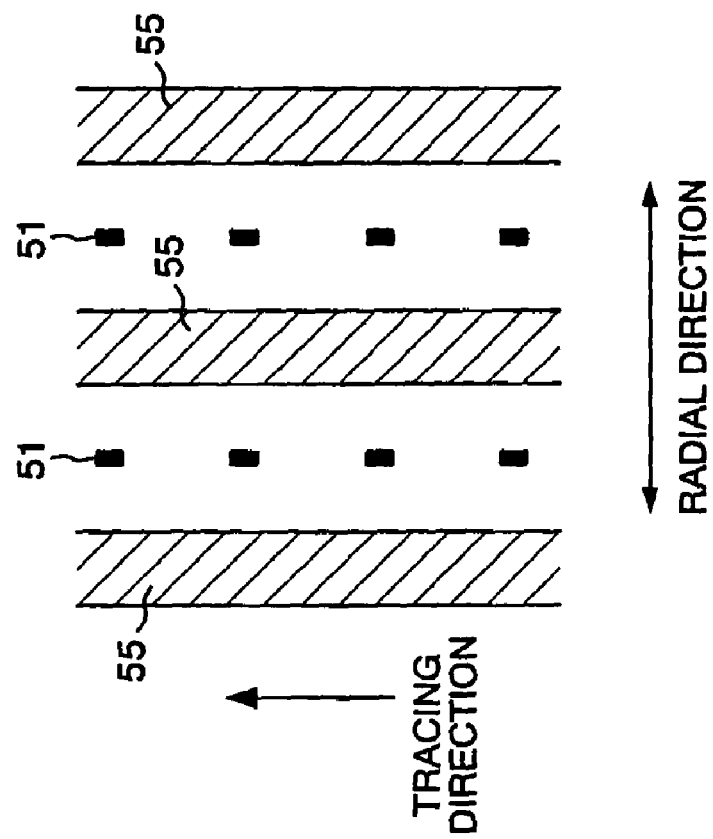
FIG. 26 shows a top view of the portion shown in FIG. 25.

Another embodiment will be described below. FIG. 23 shows cross-sectional views of a portion of the recording medium 50 in the radial direction and the tracing direction, respectively, while FIG. 24 shows a top view thereof, showing a relationship between a marker 51 and a groove 55. As shown in FIGS. 23 and 24, the recording medium 50 includes a substrate 52 and a recording layer 53 formed of a photosensitive material to be adjacent to the substrate 52. In the substrate 52, the grooves 55 are provided that indicate recording tracks. The markers 51 are formed in the substrate 52 along the grooves 55. That is, as shown in FIGS. 23 and 24, for example, the markers 51 are formed on the grooves 55. However, the positions of the markers 51 are not limited thereto. As shown in FIGS. 25 and 26, the markers 51 may be arranged between the grooves 55. In a case where the recording medium 50 is a disc-like recording medium, for example, the grooves 55 indicating the recording tracks are formed concentrically or spirally. In a case where the recording medium 50 is a card-like recording medium, the grooves 55 are formed to be linear, for example.

In still another embodiment, as shown in FIG. 27, the grooves 55 may be provided in the recording layer 53. In this case, the grooves 55 are formed to have such a depth that they do not affect on transmitted and reflected light of coherent light beams that generate an optical interference pattern, at a wavelength of the coherent light beam.

In still another embodiment, as shown in FIG. 28, the recording medium 50 includes a substrate 52 having the grooves 55 that indicate the recording tracks, a burying layer 57 for burying the substrate 52 to flatten it, which is formed adjacent to the substrate 52 and has a different refractive index from the substrate 52, and a recording layer 53 formed of a photosensitive material, adjacent to the burying layer 57. The markers 51 are formed in the substrate 52 along the grooves 55.

The recording medium and the recording and reproducing apparatus according to the present invention do not depend on a type of recording velocity. In other words, they can be applied not only to a case where recording is performed in a constant linear velocity (CLV) mode, but also a case where recording is performed in a constant angular velocity (CAV) mode, a zone constant angular velocity (ZCAV) mode or the like.

The present invention can be applied to a disc-like recording medium, as well as a card-like recording medium or the like.

According to the present invention, a holographic recording medium having a plurality of markers arranged at predetermined intervals is used, for example. An optical path of a holographic light beam and an objective lens are relatively moved in such a manner that a relative velocity of a converging position of the objective lens with respect to the recording medium in a direction along a recording track falls within a predetermined range, and during a period in which that relative velocity falls within the predetermined range, recording onto a recording layer of the recording medium or reproduction from the recording layer is performed. Thus, while the recording medium is rotated, moved or the like, holographic recording and reproduction can be achieved well. Moreover, it is possible to provide a holographic recording medium and a holographic recording and/or reproducing apparatus that enable high-speed and high-capacity recording and reproduction to be performed.

The invention claimed is:

1. A holographic recording apparatus for recording a piece of data on a holographic medium in a form of a flat plate which includes a recording layer comprising a photosensitive material and for which recording is achieved by an interference pattern of a coherent light beam, the apparatus comprising:

a pickup including an objective lens which focuses the coherent light beam, for moving the objective lens along a recording track of the holographic recording medium and detecting reflected light from the recording track to perform focus- and tracking-servo control, and for detecting a marker provided in the holographic recording medium based on reflected light from the marker to generate a marker detection signal;

a relative velocity determination unit for determining, using the marker detection signal, a relative velocity of a converging position of the objective lens with respect to the holographic recording medium;

a driving unit for driving the objective lens or a mirror arranged in an optical path of the coherent light beam to the objective lens; and a control unit, which performs recording on the recording layer while detecting the marker, for performing control of the driving unit based on the relative velocity such that the converging position of the objective lens tracks the marker.

2. The holographic recording apparatus according to claim 1,
wherein the control unit performs control of the driving unit to drive the objective lens so that the relative velocity falls within a predetermined range at least during a predetermined period.

3. The holographic recording apparatus according to claim 2, wherein the control unit performs control of the driving unit to drive the objective lens such that a moving distance of the converging position relative to the holographic recording medium falls within half a period of a pitch of interference fringes at least during a time period for recording a piece of data, the interference fringes being generated by the coherent light beam.

4. A holographic reproducing apparatus for reproducing a piece of data recorded on a holographic recording medium in a form of a flat plate which includes a recording layer comprising a photosensitive material and for which recording is achieved by an interference pattern of a coherent light beam, the apparatus comprising:

a pickup including an objective lens which focuses the coherent light beam, for moving the objective lens along a recording track of the holographic recording medium and detecting reflected light from the recording track so as to perform focus- and tracking-servo control, and for detecting a marker provided in the holographic recording medium based on reflected light from the marker to generate a marker detection signal;

a relative velocity determination unit for determining, using the marker detection signal, a relative velocity of a converging position of the objective lens with respect to the holographic recording medium;

a driving unit for driving the objective lens or a mirror arranged in an optical path of the coherent light beam to the objective lens; and a control unit, which performs reproduction from the recording layer while detecting the marker, for performing control of the driving unit based on the relative velocity such that the converging position of the objective lens tracks the marker.

5. The holographic reproducing apparatus according to claim 4,
wherein the control unit performs control of the driving unit to drive the objective lens so that the relative velocity falls within a predetermined range at least during a predetermined period.

6. The holographic reproducing apparatus according to claim 5,
wherein the control unit performs control of the driving unit to drive the objective lens such that a moving distance of the converging position relative to the holographic recording medium falls within half a period of a pitch of interference fringes at least during a time period for reproducing a piece of data,
the interference fringes being generated by the coherent light beam.

7. A holographic recording method for recording data on a holographic recording medium in a form of a flat plate which includes a recording layer comprising a photosensitive material and for which recording is achieved by an interference pattern of a coherent light beam, the method comprising:

a step of focusing the coherent light beam by an objective lens;

a step of moving the objective lens along a recording track of the holographic recording medium and detecting reflected light from the recording track to perform focus- and tracking-servo control, and to detect a marker provided in the holographic recording medium based on reflected light from the marker to generate a marker detection signal;

a step of determining, using the marker detection signal, a relative velocity of a converging position of the objective lens with respect to the holographic recording medium;

a driving step of driving the objective lens or a mirror arranged in an optical path of the coherent light beam to the objective lens; and a step of performing recording on the recording layer while detecting the marker, said recording being based on the relative velocity such that the converging position of the objective lens tracks the marker.

8. The holographic recording method according to claim 7, wherein the driving step drives the objective lens so that the relative velocity falls within a predetermined range at least during a predetermined period.

9. The holographic recording method according to claim 8, wherein the driving step drives the objective lens such that a moving distance of the converging position relative to the holographic recording medium falls within half a period of a pitch of interference fringes at least during a time period for recording a piece of data,
the interference fringes being generated by the coherent light beam.

10. A holographic reproducing method for reproducing data recorded on a holographic recording medium in a form of a flat plate which includes a recording layer comprising a photosensitive material and for which recording is achieved by an interference pattern of a coherent light pattern, the method comprising:

a step of focusing the coherent light beam by an objective lens;

a step of moving the objective lens along a recording track of the holographic recording medium and detecting reflected light from the recording track so as to perform focus- and tracking-servo control, and to detect a marker provided in the holographic recording medium based on reflected light from the marker to generate a marker detection signal;

a step of determining, using the marker detection signal, a relative velocity of a converging position of the objective lens with respect to the holographic recording medium;

a driving step of driving the objective lens or a mirror arranged in an optical path of the coherent light beam to the objective lens; and a step of performing reproduction from the recording layer while detecting the marker, said reproduction being based on the relative velocity such that the converging position of the objective lens tracks the marker.

11. The holographic reproducing method according to claim 10,
wherein the driving step drives the objective lens so that the relative velocity falls within a predetermined range at least during a predetermined period.

12. The holographic reproducing method according to claim 11,
wherein the driving step drives the objective lens such that a moving distance of the converging position relative to the holographic recording medium falls within half a period of a pitch of interference fringes at least during a time period for reproducing a piece of data,
the interference fringes being generated by the coherent light beam.

* * * * *